US010325360B2

(12) United States Patent
Nguyen et al.

(10) Patent No.: US 10,325,360 B2
(45) Date of Patent: Jun. 18, 2019

(54) SYSTEM FOR BACKGROUND SUBTRACTION WITH 3D CAMERA

(71) Applicant: The Board of Trustees of the University of Illinois, Urbana, IL (US)

(72) Inventors: Quang H. Nguyen, Ho Chi Minh (VN); Minh N. Do, Urbana, IL (US); Sanjay J Patel, Urbana, IL (US); Daniel P. Dabbelt, Cambridge, MA (US); Dennis J. Lin, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 51 days.

(21) Appl. No.: 15/785,407

(22) Filed: Oct. 16, 2017

(65) Prior Publication Data

US 2018/0089814 A1 Mar. 29, 2018

Related U.S. Application Data

(63) Continuation of application No. 15/389,952, filed on Dec. 23, 2016, now Pat. No. 9,792,676, which is a (Continued)

(51) Int. Cl.

*G06K 9/00* (2006.01)
*G06T 5/50* (2006.01)

(Continued)

(52) U.S. Cl.

CPC ............ *G06T 5/50* (2013.01); *G06K 9/00201* (2013.01); *G06K 9/00711* (2013.01); *G06K 9/38* (2013.01); *G06T 7/11* (2017.01); *G06T 7/12* (2017.01); *G06T 7/174* (2017.01); *G06T 7/194* (2017.01); *G06T 7/90* (2017.01); *H04N 5/2226* (2013.01);

(Continued)

(58) Field of Classification Search

CPC .... G06T 5/50; G06T 7/90; G06T 7/12; G06T 7/174; G06T 7/11; G06T 7/194; G06T 2207/10024; G06T 2207/10021; G06T 2207/10028; G06T 2207/20224;

(Continued)

(56) References Cited

U.S. PATENT DOCUMENTS

| | | | |
|---|---|---|---|
| 5,001,558 | A | 3/1991 | Burley |
| 5,022,085 | A | 6/1991 | Cok |

(Continued)

FOREIGN PATENT DOCUMENTS

| | | |
|---|---|---|
| WO | 2013019259 | 2/2013 |

OTHER PUBLICATIONS

Arbelaez, P., et ,al., "Contour detection and hierarchical image segmentation", Pattern Analysis and Machine Intelligence, IEEE Transactions on 33.4 (2011): 898-916.

(Continued)

*Primary Examiner* — Aaron W Carter
(74) *Attorney, Agent, or Firm* — Invention Mine LLC

(57) ABSTRACT

A system for background image subtraction includes a computing device coupled with a 3D video camera, a processor of the device programmed to receive a video feed from the camera containing images of one or more subject that include depth information. The processor, for an image: segments pixels and corresponding depth information to identify foreground regions associated with a target user.

10 Claims, 17 Drawing Sheets

Related U.S. Application Data continuation of application No. 14/805,335, filed on Jul. 21, 2015, now Pat. No. 9,530,044, which is a continuation of application No. 14/174,498, filed on Feb. 6, 2014, now Pat. No. 9,087,229, which is a continuation of application No. 12/871,428, filed on Aug. 30, 2010, now Pat. No. 8,649,592.

(51) Int. Cl.

| | |
|---|---|
| ***G06K 9/38*** | (2006.01) |
| ***H04N 5/222*** | (2006.01) |
| ***H04N 5/272*** | (2006.01) |
| ***G06T 7/11*** | (2017.01) |
| ***G06T 7/194*** | (2017.01) |
| ***G06T 7/12*** | (2017.01) |
| ***G06T 7/174*** | (2017.01) |
| ***G06T 7/90*** | (2017.01) |

(52) U.S. Cl.
CPC ... *H04N 5/272* (2013.01); *G06T 2207/10021* (2013.01); *G06T 2207/10024* (2013.01); *G06T 2207/10028* (2013.01); *G06T 2207/20224* (2013.01)

(58) Field of Classification Search
CPC .. G06K 9/00711; G06K 9/00201; G06K 9/38; H04N 5/272; H04N 5/2226
See application file for complete search history.

(56) References Cited

U.S. PATENT DOCUMENTS

| | | | | |
|---|---|---|---|---|
| 5,117,283 | A | 5/1992 | Kroos | |
| 5,227,985 | A | 7/1993 | DeMenthon | |
| 5,343,311 | A | 8/1994 | Morag | |
| 5,506,946 | A | 4/1996 | Bar | |
| 5,517,334 | A | 5/1996 | Morag | |
| 5,534,917 | A | 7/1996 | MacDougall | |
| 5,581,276 | A | 12/1996 | Cipolla | |
| 5,631,697 | A | 5/1997 | Nishimura | |
| 5,687,306 | A | 11/1997 | Blank | |
| 5,875,040 | A | 2/1999 | Matraszek | |
| 6,119,147 | A | 9/2000 | Toomey | |
| 6,125,194 | A | 9/2000 | Yeh | |
| 6,150,930 | A | 11/2000 | Cooper | |
| 6,288,703 | B1 | 9/2001 | Berman | |
| 6,411,744 | B1 | 6/2002 | Edwards | |
| 6,600,475 | B2 | 7/2003 | Gutta | |
| 6,618,444 | B1 | 9/2003 | Haskell | |
| 6,658,136 | B1 * | 12/2003 | Brumitt | G06K 9/00362 382/103 |
| 6,661,918 | B1 | 12/2003 | Gordon | |
| 6,664,973 | B1 | 12/2003 | Iwamoto | |
| 6,760,749 | B1 | 7/2004 | Dunlap | |
| 6,798,407 | B1 | 9/2004 | Benman | |
| 6,937,744 | B1 | 8/2005 | Toyama | |
| 6,973,201 | B1 | 12/2005 | Colmenarez | |
| 7,050,070 | B2 | 5/2006 | Ida | |
| 7,124,164 | B1 | 10/2006 | Chemtob | |
| 7,317,830 | B1 | 1/2008 | Gordon | |
| 7,386,799 | B1 | 6/2008 | Clanton | |
| 7,420,490 | B2 | 9/2008 | Gupta | |
| 7,420,590 | B2 | 9/2008 | Matusik | |
| 7,463,296 | B2 | 12/2008 | Sun | |
| 7,512,262 | B2 | 3/2009 | Criminisi | |
| 7,518,051 | B2 | 4/2009 | Redmann | |
| 7,574,043 | B2 * | 8/2009 | Porikli | G06K 9/346 382/103 |
| 7,599,555 | B2 | 10/2009 | McGuire | |
| 7,602,990 | B2 | 10/2009 | Matusik | |
| 7,631,151 | B2 | 12/2009 | Prahlad | |
| 7,633,511 | B2 | 12/2009 | Shum | |
| 7,634,533 | B2 | 12/2009 | Rudolph | |
| 7,668,371 | B2 | 2/2010 | Dorai | |
| 7,676,081 | B2 | 3/2010 | Blake | |
| 7,692,664 | B2 | 4/2010 | Weiss | |
| 7,720,283 | B2 | 5/2010 | Sun | |
| 7,742,650 | B2 | 6/2010 | Xu | |
| 7,747,044 | B2 | 6/2010 | Baker | |
| 7,755,016 | B2 | 7/2010 | Toda | |
| 7,773,136 | B2 | 8/2010 | Ohyama | |
| 7,821,552 | B2 | 10/2010 | Suzuki | |
| 7,831,087 | B2 | 11/2010 | Harville | |
| 7,912,246 | B1 | 3/2011 | Moon | |
| 7,965,885 | B2 | 6/2011 | Iwai | |
| 8,073,196 | B2 | 12/2011 | Yuan | |
| 8,094,928 | B2 | 1/2012 | Graepel | |
| 8,131,011 | B2 | 3/2012 | Nevatia | |
| 8,146,005 | B2 | 3/2012 | Jones | |
| 8,175,379 | B2 | 5/2012 | Wang | |
| 8,175,384 | B1 | 5/2012 | Wang | |
| 8,204,316 | B2 | 6/2012 | Panahpour | |
| 8,225,208 | B2 | 7/2012 | Sprang | |
| 8,238,605 | B2 | 8/2012 | Chien | |
| 8,249,333 | B2 | 8/2012 | Agarwal | |
| 8,264,544 | B1 | 9/2012 | Chang | |
| 8,300,890 | B1 | 10/2012 | Gaikwad | |
| 8,300,938 | B2 | 10/2012 | Can | |
| 8,320,666 | B2 | 11/2012 | Gong | |
| 8,331,619 | B2 | 12/2012 | Ikenoue | |
| 8,331,685 | B2 | 12/2012 | Pettigrew | |
| 8,335,379 | B2 | 12/2012 | Malik | |
| 8,345,082 | B2 | 1/2013 | Tysso | |
| 8,355,379 | B2 | 1/2013 | Thomas | |
| 8,363,908 | B2 | 1/2013 | Steinberg | |
| 8,379,101 | B2 | 2/2013 | Mathe | |
| 8,411,149 | B2 | 2/2013 | Maison | |
| 8,396,328 | B2 | 3/2013 | Sandrew | |
| 8,406,494 | B2 | 3/2013 | Zhan | |
| 8,411,948 | B2 | 4/2013 | Rother | |
| 8,422,769 | B2 | 4/2013 | Rother | |
| 8,437,570 | B2 | 5/2013 | Criminisi | |
| 8,446,459 | B2 | 5/2013 | Fang | |
| 8,446,488 | B2 | 5/2013 | Yim | |
| 8,477,149 | B2 | 7/2013 | Beato | |
| 8,503,720 | B2 | 8/2013 | Shotton | |
| 8,533,593 | B2 | 9/2013 | Grossman | |
| 8,533,594 | B2 | 9/2013 | Grossman | |
| 8,533,595 | B2 | 9/2013 | Grossman | |
| 8,565,485 | B2 | 10/2013 | Craig | |
| 8,588,515 | B2 | 11/2013 | Bang | |
| 8,625,897 | B2 | 1/2014 | Criminisi | |
| 8,643,701 | B2 | 2/2014 | Nguyen | |
| 8,649,592 | B2 | 2/2014 | Nguyen | |
| 8,649,932 | B2 | 2/2014 | Mian | |
| 8,655,069 | B2 | 2/2014 | Rother | |
| 8,659,658 | B2 | 2/2014 | Vassigh | |
| 8,666,153 | B2 | 3/2014 | Hung | |
| 8,682,072 | B2 | 3/2014 | Sengamedu | |
| 8,701,002 | B2 | 4/2014 | Grossman | |
| 8,723,914 | B2 | 5/2014 | Mackie | |
| 8,818,028 | B2 | 8/2014 | Nguyen | |
| 8,831,285 | B2 | 9/2014 | Kang | |
| 8,854,412 | B2 | 10/2014 | Tian | |
| 8,874,525 | B2 | 10/2014 | Grossman | |
| 8,890,923 | B2 | 11/2014 | Tian | |
| 8,890,929 | B2 | 11/2014 | Paithankar | |
| 8,897,562 | B2 | 11/2014 | Bai | |
| 8,913,847 | B2 | 12/2014 | Tang | |
| 8,994,778 | B2 | 3/2015 | Weiser | |
| 9,008,457 | B2 | 4/2015 | Dikmen | |
| 9,053,573 | B2 | 6/2015 | Lin | |
| 9,065,973 | B2 | 6/2015 | Graham | |
| 9,084,928 | B2 | 7/2015 | Klang | |
| 9,087,229 | B2 | 7/2015 | Nguyen | |
| 9,088,692 | B2 | 7/2015 | Carter | |
| 9,117,310 | B2 | 8/2015 | Coene | |
| 9,269,153 | B2 | 2/2016 | Gandolph | |
| 9,285,951 | B2 | 3/2016 | Makofsky | |
| 9,336,610 | B2 | 5/2016 | Ohashi | |
| 9,530,044 | B2 * | 12/2016 | Nguyen | G06K 9/38 |
| 9,542,626 | B2 | 1/2017 | Martinson | |

(56) References Cited

U.S. PATENT DOCUMENTS

| | | | | |
|---|---|---|---|---|
| 2002/0012072 | A1 | 1/2002 | Toyama | |
| 2002/0025066 | A1 | 2/2002 | Pettigrew | |
| 2002/0051491 | A1 | 5/2002 | Challapali | |
| 2002/0158873 | A1 | 10/2002 | Williamson | |
| 2004/0004626 | A1 | 1/2004 | Ida | |
| 2004/0153671 | A1 | 8/2004 | Schuyler | |
| 2004/0175021 | A1 | 9/2004 | Porter | |
| 2005/0063565 | A1 | 3/2005 | Nagaoka | |
| 2005/0094879 | A1 | 5/2005 | Harville | |
| 2005/0219264 | A1 | 10/2005 | Shum | |
| 2005/0219391 | A1 | 10/2005 | Sun | |
| 2005/0262201 | A1 | 11/2005 | Rudolph | |
| 2005/0285874 | A1* | 12/2005 | Zitnick, III | G06T 15/205 345/592 |
| 2005/0286759 | A1* | 12/2005 | Zitnick, III | G06T 15/205 382/154 |
| 2006/0072022 | A1 | 4/2006 | Iwai | |
| 2006/0193509 | A1 | 8/2006 | Criminisi | |
| 2006/0221248 | A1 | 10/2006 | McGuire | |
| 2006/0259552 | A1 | 11/2006 | Mock | |
| 2006/0291697 | A1 | 12/2006 | Luo | |
| 2007/0036432 | A1 | 2/2007 | Xu | |
| 2007/0070200 | A1 | 3/2007 | Matusik | |
| 2007/0110298 | A1 | 5/2007 | Graepel | |
| 2007/0133880 | A1 | 6/2007 | Sun | |
| 2007/0146512 | A1 | 6/2007 | Suzuki | |
| 2007/0201738 | A1 | 8/2007 | Toda | |
| 2007/0269108 | A1 | 11/2007 | Steinberg | |
| 2008/0109724 | A1 | 5/2008 | Gallmeier | |
| 2008/0158340 | A1* | 7/2008 | Shibata | H04N 7/144 348/14.16 |
| 2008/0181507 | A1 | 7/2008 | Gope | |
| 2008/0184124 | A1* | 7/2008 | Agarwal | G06Q 10/10 715/733 |
| 2008/0219554 | A1 | 9/2008 | Dorai | |
| 2008/0246759 | A1 | 10/2008 | Summers | |
| 2008/0266380 | A1 | 10/2008 | Gorzynski | |
| 2008/0273751 | A1 | 11/2008 | Yuan | |
| 2008/0316328 | A1* | 12/2008 | Steinberg | G06K 9/036 348/222.1 |
| 2008/0317378 | A1* | 12/2008 | Steinberg | G06T 5/50 382/275 |
| 2009/0003687 | A1 | 1/2009 | Agarwal | |
| 2009/0044113 | A1 | 2/2009 | Jones | |
| 2009/0110299 | A1 | 4/2009 | Panahpour | |
| 2009/0116732 | A1 | 5/2009 | Zhou | |
| 2009/0116766 | A1 | 5/2009 | Matsumoto | |
| 2009/0144651 | A1 | 6/2009 | Sprang | |
| 2009/0154807 | A1* | 6/2009 | Rossato | G06K 9/38 382/173 |
| 2009/0199111 | A1 | 8/2009 | Emori | |
| 2009/0219379 | A1* | 9/2009 | Rossato | H04N 5/272 348/14.01 |
| 2009/0244309 | A1 | 10/2009 | Maison | |
| 2009/0245571 | A1 | 10/2009 | Chien | |
| 2009/0249863 | A1 | 10/2009 | Kim | |
| 2009/0278859 | A1 | 11/2009 | Weiss | |
| 2009/0284627 | A1 | 11/2009 | Bando | |
| 2009/0290795 | A1 | 11/2009 | Criminisi | |
| 2009/0300553 | A1 | 12/2009 | Pettigrew | |
| 2010/0027961 | A1 | 2/2010 | Gentile | |
| 2010/0034457 | A1 | 2/2010 | Berliner | |
| 2010/0046830 | A1 | 2/2010 | Wang | |
| 2010/0053212 | A1 | 3/2010 | Kang | |
| 2010/0128927 | A1 | 5/2010 | Ikenoue | |
| 2010/0166325 | A1* | 7/2010 | Sengamedu | G06T 7/11 382/224 |
| 2010/0171807 | A1 | 7/2010 | Tysso | |
| 2010/0195898 | A1 | 8/2010 | Bang | |
| 2010/0278384 | A1 | 11/2010 | Shotton | |
| 2010/0302376 | A1 | 12/2010 | Boulanger | |
| 2010/0302395 | A1 | 12/2010 | Mathe | |
| 2010/0329544 | A1 | 12/2010 | Sabe | |
| 2011/0007183 | A1 | 1/2011 | Kahlman | |
| 2011/0038536 | A1 | 2/2011 | Gong | |
| 2011/0090311 | A1 | 4/2011 | Fang | |
| 2011/0115886 | A1 | 5/2011 | Nguyen | |
| 2011/0158529 | A1 | 6/2011 | Malik | |
| 2011/0193939 | A1 | 8/2011 | Vassigh | |
| 2011/0216965 | A1 | 9/2011 | Rother | |
| 2011/0216975 | A1 | 9/2011 | Rother | |
| 2011/0216976 | A1 | 9/2011 | Rother | |
| 2011/0242277 | A1 | 10/2011 | Do | |
| 2011/0243430 | A1 | 10/2011 | Hung | |
| 2011/0249190 | A1 | 10/2011 | Nguyen | |
| 2011/0249863 | A1 | 10/2011 | Ohashi | |
| 2011/0249883 | A1 | 10/2011 | Can | |
| 2011/0267348 | A1 | 11/2011 | Lin | |
| 2011/0293179 | A1 | 12/2011 | Dikmen | |
| 2011/0293180 | A1 | 12/2011 | Criminisi | |
| 2012/0019728 | A1* | 1/2012 | Moore | H04N 5/144 348/678 |
| 2012/0051631 | A1 | 3/2012 | Nguyen | |
| 2012/0127259 | A1 | 5/2012 | Mackie | |
| 2012/0287233 | A1* | 11/2012 | Wang | H04N 13/128 348/42 |
| 2012/0314077 | A1 | 12/2012 | Clavenna, II | |
| 2012/0317511 | A1 | 12/2012 | Bell | |
| 2013/0016097 | A1 | 1/2013 | Coene | |
| 2013/0028476 | A1 | 1/2013 | Craig | |
| 2013/0084006 | A1* | 4/2013 | Zhang | G06T 7/194 382/173 |
| 2013/0094780 | A1 | 4/2013 | Tang | |
| 2013/0110565 | A1 | 5/2013 | Means | |
| 2013/0129205 | A1 | 5/2013 | Wang | |
| 2013/0142452 | A1 | 6/2013 | Shionozaki | |
| 2013/0147900 | A1 | 6/2013 | Weiser | |
| 2013/0243313 | A1 | 9/2013 | Civit | |
| 2013/0335506 | A1 | 12/2013 | Carter | |
| 2014/0003719 | A1 | 1/2014 | Bai | |
| 2014/0029788 | A1 | 1/2014 | Kang | |
| 2014/0063177 | A1 | 3/2014 | Tian | |
| 2014/0085398 | A1 | 3/2014 | Tian | |
| 2014/0112547 | A1 | 4/2014 | Peeper | |
| 2014/0119642 | A1 | 5/2014 | Lee | |
| 2014/0153784 | A1 | 6/2014 | Gandolph | |
| 2014/0229850 | A1 | 8/2014 | Makofsky | |
| 2014/0300630 | A1 | 10/2014 | Flider | |
| 2014/0307056 | A1 | 10/2014 | Romea | |
| 2015/0029294 | A1* | 1/2015 | Lin | H04N 7/141 348/14.01 |
| 2015/0187076 | A1 | 7/2015 | DennisLin | |
| 2015/0189146 | A1 | 7/2015 | Venshtain | |
| 2016/0343141 | A1 | 11/2016 | Lin | |
| 2017/0109872 | A1* | 4/2017 | Nguyen | G06K 9/38 |
| 2017/0208243 | A1 | 7/2017 | Masad | |

OTHER PUBLICATIONS

Benezeth et al., "Review and Evaluation of Commonly-Implemented Background Subtraction Algorithms", 2008.

Carsten, R., et al., "Grabcut: Interactive foreground extraction using iterated graph cuts", ACM Transactions on Graphics (TOG) 23.3 (2004), pp. 309-314.

Crabb et al., "Real-Time Foreground Segmentation via Range and Color Imaging", 2008.

Gvili et al., "Depth Keying", 2003.

Kolmogorov, et al., "Bi-Layer Segmentation of Binocular Stereo Video", IEEE, 2005.

Izquierdo' M. Ebroul. "Disparity/segmentation analysis: matching with an adaptive window and depth-driven segmentation." Circuits and Systems for Video Technology, IEEE Transactions on 9.4 (1999): 589-607.

Piccardi, M., "Background Subtraction Techniques: A Review", IEEE, 2004.

Wang, L., et al., "Tofcut: Towards robust real-time foreground extraction using a Time-of-Flight camera.", Proc. of 3DPVT, 2010.

Xu, F., et al., "Human detection using depth and gray images", Advanced Video and Signal Based Surveillance, 2003., Proceedings, IEEE Conference on IEEE, 2003.

(56) References Cited

OTHER PUBLICATIONS

Zhang, Q., et al., "Segmentation and tracking multiple objects under occlusion from multiview video.", Image Processing, IEEE Transactions on 20.11 (2011), pp. 3308-3313.
Kitagawa et al., "Background Separation Encoding for Surveillance Purpose by using Stable Foreground Separation", APSIPA, Oct. 4-7, 2009, pp. 849-852.
Lee, D.S., "Effective Gaussian Mixture Learning for Video Background Subtraction", IEEE, vol. 27, No. 5, dated May 2005, pp. 827-832.
Akbarzadeh, A., et al., "Towards Urban 3D Reconstruction From Video," Third International Symposium on 3D Data Processing, Visualization, and Transmission, pp. 1-8 (Jun. 14-16, 2006).
Barnat, Jii'f, et al., "CUDA accelerated LTL Model Checking," FI MU Report Series, FIMU-RS-2009-05, 20 pages (Jun. 2009).
Canesta™, "See How Canesta's Solution Gesture Control Will Change the Living Room," retrieved Oct. 21, 2010, from http://canesta.com, 2 pages.
Chan, S.C., et al., "Image-Based Rendering and Synthesis," IEEE Signal Processing Magazine, pp. 22-31 (Nov. 2007).
Chan, Shing-Chow, et al. "The Plenoptic Video," 15(12) IEEE Transactions on Circuits and Systems for Video Technology 1650-1659 (Dec. 2005).
Chen, Wan-Yu, et al., "Efficient Depth Image Based Rendering with Edge Dependent Depth Filter and Interpolation," IEEE International Conference on Multimedia and Expo, pp. 1314-1317 (Jul. 6, 2005).
Debevec, Paul, et al., "Efficient View-Dependent Image-Based Rendering with Projective Texture-Mapping," In 9th Eurographics Workshop on Rendering, pp. 105-116 (Jun. 1998).
Fehn, Christoph, et al., "Interactive 3-DTV-Concepts and Key Technologies," 94(3) Proceedings of the IEEE 524-538 (Mar. 2006).
GPGPU (General-purpose computing on graphics processing units)—Wikipedia, retrieved Nov. 17, 2009, from http://en.wikipedia.org/wiki/GPGPU, 9 pages.
Ho, Yo-Sung, et al., "Three-dimensional Video Generation for Realistic Broadcasting Services," ITC-CSCC, pp. TR-1 through TR4 (2008).
Jung, Kwang Hee, et al., "Depth Image Based Rendering for 3D Data Service Over T-DMB," IEEE, 3DTV-CON'08, Istanbul, Turkey, pp. 237-240 (May 28-30, 2008).
Kanade, Takeo, et al., "Virtualized Reality: Constructing Virtual Worlds from Real Scenes," IEEE MultiMedia, pp. 34-46 (Jan.-Mar. 1997).
Kao, Wen-Chung, et al., "Multistage Bilateral Noise Filtering and Edge Detection for Color Image Enhancement," 51(4) IEEE Transactions on Consumer Electronics 1346-1351 (Nov. 2005).
Kipfer, Peter, "GPU Gems 3—Chapter 33. LCP Algorithms for Collision Detection Using CUDA," retrieved Nov. 17, 2009, from http://http.developer.nvidia.com/GPUGems3/qpuqems3 ch33.html, 11 pages (2007).
Kubota, Akira, et al., "Multiview Imaging and 3DTV," IEEE Signal Processing Magazine, pp. 10-21 (Nov. 2007).
Lee, Eun-Kyung, et al., "High-Resolution Depth Map Generation by Applying Stereo Matching Based on Initial Depth Information," 3DTV-CON'08, Istanbul, Turkey, pp. 201-204 (May 28-30, 2008).
Mark, William R., et al., "Post-Rendering 3D Warping," In Proceedings of 1997 Symposium on Interactive 3D Graphics, Providence, RI, pp. 7-16 (Apr. 27-30, 1997).
McMillan, Jr., Leonard, "An Image-Based Approach to Three-Dimensional Computer Graphics," University of North Carolina at Chapel Hill, Chapel Hill, NC, 206 pages (1997).
Nguyen, Ha T., et al., "Image-Based Rendering with Depth Information Using the Propagation Algorithm," Proc. of IEEE International Conference on Acoustics, Speech, and Signal Processing (ICASSP), 4 pages (Mar. 2005).
Nguyen, Quang H., et al., "Depth image-based rendering from multiple cameras with 3D propagation algorithm," Proceedings of the 2nd International Conference on Immersive Telecommunications, 6 pages (2009).
Nguyen, Quang H., et al., "Depth Image-Based Rendering with Low Resolution Depth," 16th IEEE International Conference on Image Processing (ICIP), pp. 553-556 (2009).
PrimeSense, Home Page, retrieved Oct. 21, 2010, from http://www.primesense.com, 1 page.
Saxena, Ashutosh, et al., "3-D Depth Reconstruction from a Single Still Image," 76(1) International Journal of Computer Vision 53-69 (2007).
Shade, Jonathan, et al., "Layered Depth Images," Computer Graphics Proceedings, Annual Conference Series, pp. 231-242 (Jul. 19-24, 1998).
Tomasi, C., et al., "Bilateral Filtering for Gray and Color Images," Sixth International Conference on Computer Vision, pp. 839-846 (1998).
Vazquez, C., et al., "3D-TV: Coding of Disocclusions for 2D+Depth Representation of Multi-View Images," Proceedings of the Tenth IASTED Int'l Conference: Computer Graphics and Imaging, pp. 26-33 (Feb. 13-15, 2008).
Yang, Qingxiong, et al., "Spatial-Depth Super Resolution for Range Images," IEEE Conference on Computer Vision and Pattern Recognition, pp. 1-8 (2007).
Zhang, Buyue, et al., "Adaptive Bilateral Filter for Sharpness Enhancement and Noise Removal," IEEE ICIP, pp. IV-417-IV-420 (2007).
H. Y. Shum and S. B. Kang, "A Review of Image-based Rendering Techniques," Proc. IEEE/SPIE Visual Communications and Image (VCIP) 2000, pp. 2-13, Perth, Jun. 2000.
Um, Gi-Mun, et al., "Three-dimensional Scene Reconstruction Using Multi-View Images and Depth Camera", pp. 271-280, SPIE-IS&t, vol. 5664, 2005.
Zitnick, C. Lawrence, et al., "High-quality video view interpolation using a layered representation," 23(3) Journal ACM Transactions on Graphics (TOG)—Proceedings of ACM SIGGRAPH 2004, pp. 600-608 (Aug. 2004).
Working screenshot of Snagit manufactured by Techsmith, released Apr. 18, 2014.
Yacoob, Y., et al., "Detection, analysis and matching of hair," in Computer Vision, 2005, ICCV 2005. Tenth IEEE International Conference, vol. 1., No., pp. 741-748, vol. 1, Oct. 17-21, 2005.
Talukder, A., et al., "Real-time detection of moving objects in a dynamic scene from moving robotic vehicles," in Intelligent Robots and Systems, 2003. (IROS 2003). Proceedings. 2003 IEEE/RSJ international Conference on, vol. 2, pp. 1308-1313, vol. 2, Oct. 27-31, 2003.
Sheasby, G., et al., "A robust stereo prior for human segmentation", In ACCV, 2012.
Hradis, M., et al., "Real-time Tracking of Participants in Meeting Video", Proceedings of CESCG, Wien, 2006.
Cheung et al., "Robust Techniques for Background Subtraction in Urban Traffic Video", 2004.

* cited by examiner

SYSTEM FOR BACKGROUND SUBTRACTION WITH 3D CAMERA

CROSS-REFERENCE TO RELATED APPLICATIONS

This application is a continuation of U.S. application Ser. No. 15/389,952, filed Dec. 23, 2016, entitled "SYSTEM FOR BACKGROUND SUBTRACTION WITH 3D CAMERA", which is a continuation of U.S. application Ser. No. 14/805,335, filed Jul. 21, 2015, entitled "SYSTEM FOR BACKGROUND SUBTRACTION WITH 3D CAMERA", now U.S. Pat. No. 9,530,044, which is a continuation of U.S. application Ser. No. 14/174,498, filed Feb. 6, 2014, entitled "SYSTEM FOR BACKGROUND SUBTRACTION WITH 3D CAMERA", now U.S. Pat. No. 9,087,229, which is a continuation of U.S. application Ser. No. 12/871,428, filed Aug. 30, 2010, entitled "SYSTEM FOR BACKGROUND SUBTRACTION WITH 3D CAMERA", now U.S. Pat. No. 8,649,592, each of which are hereby incorporated by reference in its entirety.

TECHNICAL FIELD

The present disclosure relates generally to 3D image processing, and more particularly, to a system for background subtraction from images in a video stream using a three-dimensional camera.

BACKGROUND

Background subtraction (BGS) refers to the ability to remove unwanted background from a live video. Some current video conferencing programs use BGS technology to subtract and replace the background with another prerecorded still or moving background.

There have been several methods developed for BGS using color information only. These methods are either not robust for challenging, but common, situations such as a moving background and changing lighting, or too computationally expensive to be able to run in real-time. The recent emergency of depth cameras provides an opportunity to develop robust, real-time BGS systems using depth information. However, due to current hardware limitations, some of which are fundamental, recorded depth video has poor quality. Notable problems with recorded depth are noisy and instable depth values around object boundaries, and the loss of depth values in hair of a person or shiny object areas, such as belt buckles. As a result, background removal by a simple depth thresholding-referred to as Basic BGS herein-inherits a lot of annoying visual artifacts. Ideally, a robust system will detect and eliminate visual artifacts, and reduce jitter and roughness around edges contiguous with a removed background.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

By way of introduction, the present disclosure relates to a system having a computing device (or other computer) coupled with a three-dimensional (3D) camera for subtracting a background (BG) from a video feed. The system may also replace the removed background with a new background, whether a still or video image. The system executes various, or all, of the steps executable by a background subtraction module disclosed herein to achieve step-by-step improvement in a robustness and quality of the result. That is, the module as executed by a processor eliminates the artifacts, noise, and the instability of the depth information around edges of one or more target person—also referred to as subject herein—that is to remains as foreground (FG) when the background is subtracted.

The system receives a video feed from the 3D camera that contains colored images of the one or more subject that includes depth information. For each colored image extracted from the video feed, the system segments colored pixels and corresponding depth information of the images into three different regions including foreground (FG), background (BG), and unclear (UC). The system may then categorize UC pixels as FG or BG using a function that considers the color and background history (BGH) information associated with the UC pixels and the color and BGH information associated with pixels near the UC pixels. Pixels that are near other pixels may also be referred to herein as neighbor pixels, which are pixels within a predetermined-sized window that includes the pixel of reference.

The system may also examine the pixels marked as FG and apply temporal and spatial filters to smooth boundaries of the FG regions. The system may then construct a new image by overlaying the FG regions on top of a new background, and display a video feed of the new image in a display device coupled with the computing device. The new background may include still images or video. The FG region that remains preferably includes one or more target subjects that are to be transferred from the processed image to the new image. The system may also continually maintain the BGH to keep it up to date for continued processing across multiple images within a video stream. Additional or different steps are contemplated and explained with reference to the Figures herein.

Figure 1:
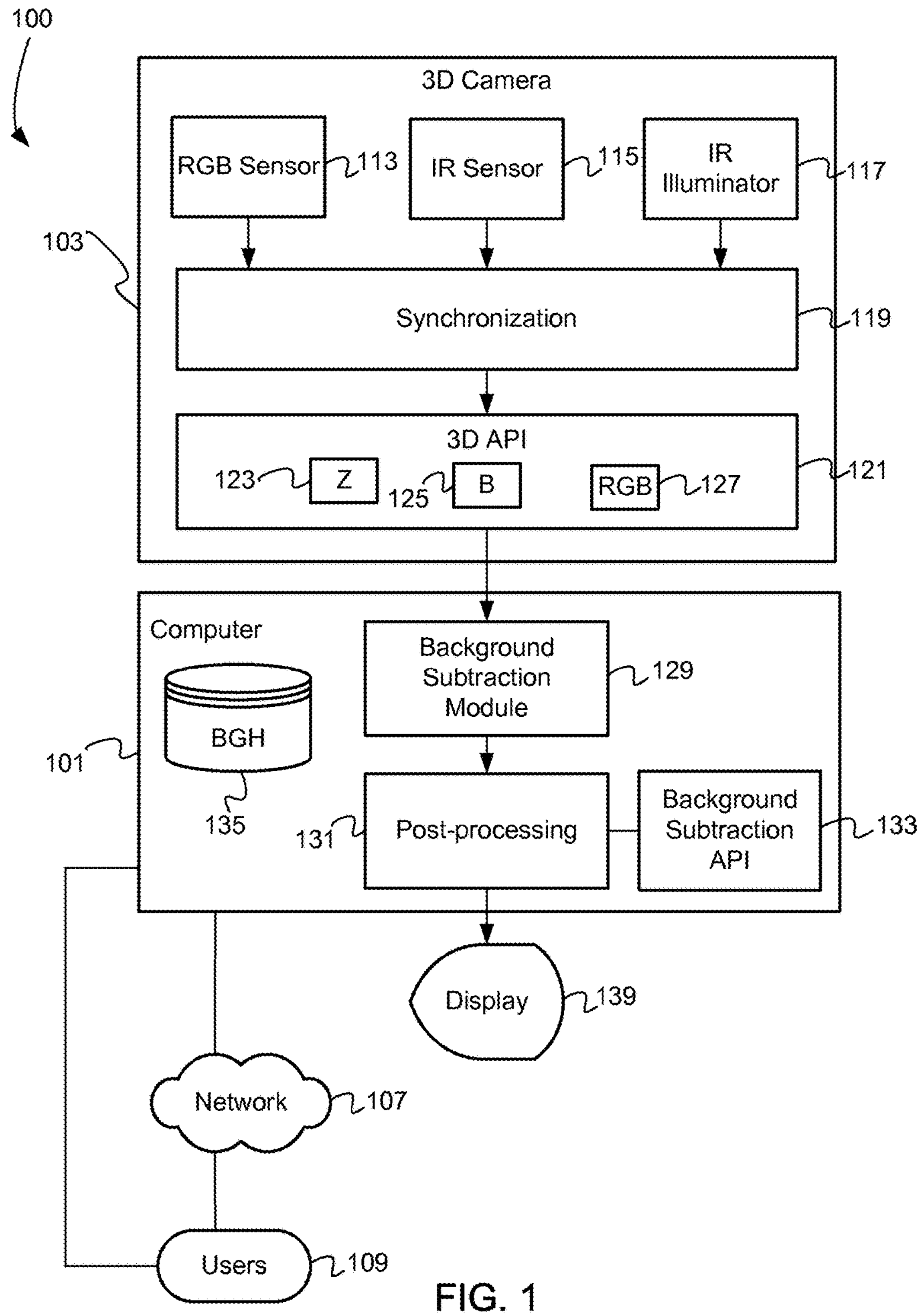
FIG. 1 is a block diagram of an embodiment of a system including a three-dimensional (3D) camera, for subtraction of a background from a video image.

FIG. 1 is a block diagram of an embodiment of a system 100 including a computing device (or other computer) 101 coupled with a 3D camera 103, for subtraction of a background (BG) from a video feed having a series of images. Herein, the phrase "coupled with" is defined to mean directly connected to or indirectly connected through one or more intermediate components. Such intermediate components may include both hardware and software based components, including a network 107 over which users 109 may access the computing device 101.

The 3D camera 103 includes, among other components, a red/green/blue (RGB) sensor 113, an infrared (IR) sensor 115, and an IR illuminator 117. The IR illuminator 117 shines light through a lens of the camera 103 and the infrared sensor 115 receives the depth information of the reflected light, giving definition to objects within view or in the "scene" of the camera 103. The RGB sensor 113 captures the colored pixel information in the scene of the captured video image. The 3D camera 103 may also include synchronization hardware and/or software 119 embedded therein to temporally synchronize the IR illuminator 117, the IR sensor 115, and the RGB sensor 113 together. The 3D camera 103 may also include a 3D application programming interface (API) 121, which may be programmed to receive the depth information (Z) 123, the brightness (B) 125, and RGB pixel 127 information of a reflected video image as captured by the 3D camera 103. The 3D API 121 provides the IO structure and interface programming required to pass this information 123, 125, and 127 to the computer or computing device 101.

The computing device 101 may further include, or be coupled with, a background subtraction module 129 stored in memory and executable by a processor, a post-processing module 131, background subtraction application programming interface (API) 133, a background history (BGH) storage 135 part of memory, and a display 139 such as a computer screen/monitor or a plasma or LCD screen of a television or smart device. Accordingly, the computing device 101 may include a desktop, laptop, smart phone, or other mobile or stationary computing device having sufficient processing power to execute the background subtraction module 129. Where X and Y axes may be referred to herein, it is with reference to a two-dimensional (2D) plane cut through some point along the Z axis.

The computing device 101 may process the background subtraction module with reference to sequential sets of images from the video feed continually in real time. The post-processing module 131 may, for instance, overlay the surviving FG regions onto a new background image, whether from a still or a video, to create a new image. Sequential, real-time processing may yield a series of such new images over the top of the new background to create a new video feed having the old background replaced with the new background. The computer 101 may then display the one or more subject in front of the new background on the display screen 139 for viewing by the user.

During the process of processing sequential colored images from an incoming video feed, background history of the sequential colored images may be kept up to date in the BGH storage 135. This history allows tracking the BG status of pixels in previous frames, e.g., whether the pixels were previously categorized as BG. This process and the way the background module incorporates BGH into a decision whether to categorized UC regions as BG will be discussed in more detail below.

Figure 2:
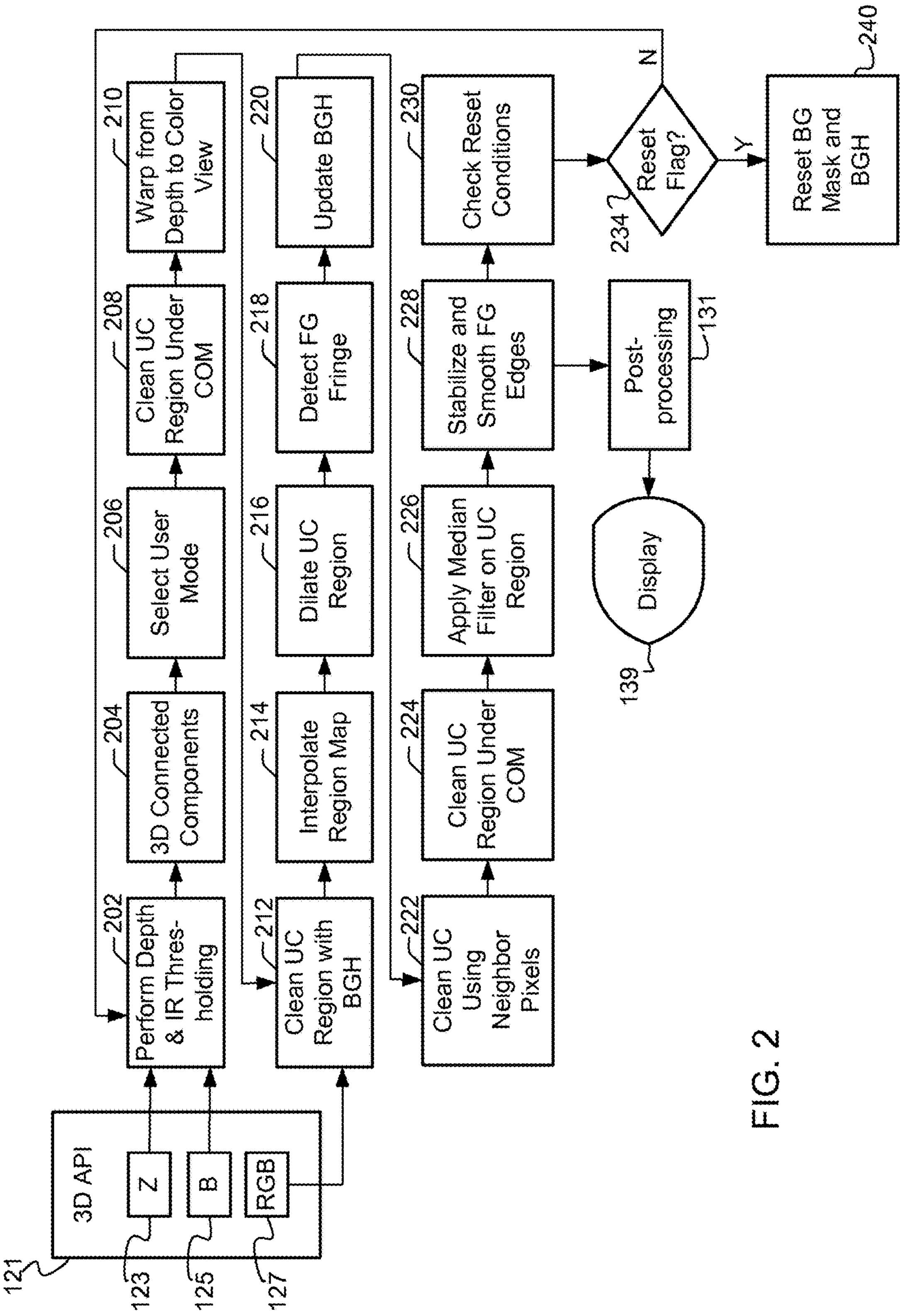
FIG. 2 is a block diagram including a flow chart showing the details of steps executed by the background subtraction module of the system of FIG. 1, to subtract a background from a video image.

FIG. 2 is a block diagram including a flow chart showing the details of steps executed by the background subtraction module 129 of the system of FIG. 1, to subtract a background from a video image. All or a subset of the steps may be executed for varying levels of robustness and quality of a resulting FG image after subtraction of the background (BG). The steps need not be executed in a specific order unless specified. Some techniques, such as interpolation, may be left out entirely, depending on system requirements, capabilities, and desired quality. Each numbered block or step in FIG. 2 will be explained in more detail later with reference to FIGS. 3-29.

At block 202, the system 100 may receive depth 123 and color 127 information of a colored image and perform depth and IR thresholding, thus segmenting colored pixels and corresponding depth information of the images into three different regions including foreground (FG), background (BG), and unclear (UC). The result of the depth and IR thresholding of the image is a region map that shows the three regions pictorially. In block 204, the system 100 may identify and clean FG, BG, and UC three-dimensional connected components. At block 206, the system 100 may enable a user 109 to select a user mode that depends on how close a target subject is located with reference to the camera 103. At block 208, the system 100 may clean the UC region under a center of mass (COM) of the target subject. At block 210, the system 100 may warp the image from a depth point of view to a color point of view, so that the depth and color information are aligned in 3D-space. At block 212, the system 100 may receive RGB color information 127 and clean the remaining UC region with background history (BGH). At block 214, the system 100 may interpolate the region map to categorize uncategorized pixels in the RGB image which have unknown depth value and unknown region value as FG or UC depending on region information of neighbor pixels. At block 216, the system 100 may dilate the UC region outward to surrounding pixels that are not in the FG region. At block 218, the system 100 may detect a FG fringe, which may include a thin area along the boundaries of the FG edges, e.g., those edges between the FG region and the UC region or the BG region. At block 220, the system 100 may update the BGH.

At block 222, the system 100 may clean the UC region using neighbor pixels, which step focuses on cleaning along the colored edge of the FG region. At block 224, the system 100 may clean the UC region under the COM of the target subject. At block 226, the system 100 may apply a median filter to the UC region to remove very small UC region, then merge the remaining UC regions into the FG regions. At block 228, the system 100 may stabilize and smooth the edges of the FG region(s). At block 230, the system 100 may check for reset conditions, and if present, sets a reset flag. At block 234, the system 100 determines if the reset flag is true, and if so, resets the flag. At block 240, the system may reset both the BGH and a BG mask of the region map. Processing by the background subtraction module 121 of the system 100 may then continue with another image from the video feed. Sequential processing of colored images may lead to a continuous, real-time video feed having the BG subtracted therefrom. At block 234, if the reset flag has not been set, e.g., it has a false value, the system 100 continues operation at block 202 again to continue processing sequential images. The same is true after resetting the BG mask and BGH at block 240.

Figure 3:
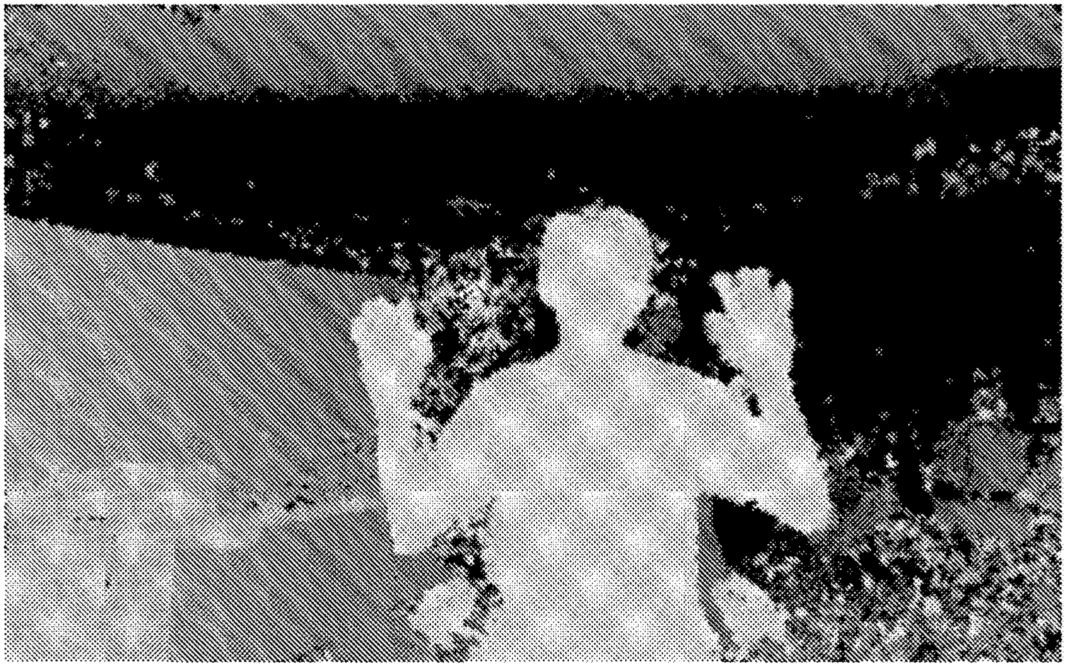
FIG. 3 is a screen shot of a captured video image showing input depth information of the video image.
Figure 4:
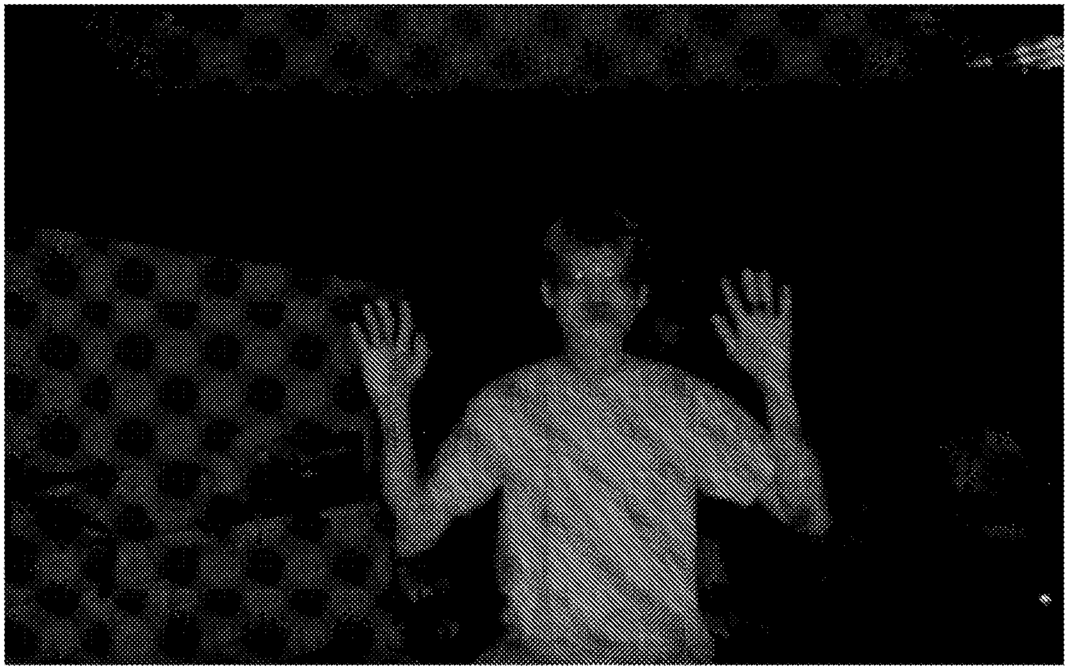
FIG. 4 is a screen shot of the input infrared (IR) intensity of the video image captured in FIG. 3.
Figure 5:
FIG. 5 is a screen shot of the input red/green/blue (RGB) color information of the video image captured in FIG. 3.
Figure 6:
FIG. 6 is a region map of the video image captured in FIG. 3, the regions displayed including unclear (UC) in light grey, foreground (FG) in dark grey, and background (BG) in black, which are generated in block 202 of FIG. 2.

FIG. 3 is a screen shot of a system-captured video image showing input depth information of the video image. FIG. 4 is a screen shot of the input infrared (IR) intensity of the video image captured in FIG. 3. FIG. 5 is a screen shot of the input red/green/blue (RGB) color information of the video image captured in FIG. 3. FIG. 6 is a region map of the video image captured in FIG. 3, the regions displayed including unclear (UC) in light grey, foreground (FG) in dark grey, and background (BG) in black, which are generated in block 202 of FIG. 2. In block 202, the background subtraction module 131 may perform depth and IR thresholding, thus segmenting colored pixels and corresponding depth information of the images into three different regions including foreground (FG), background (BG), and unclear (UC).

As discussed earlier, the "z" as used herein is with reference to a depth value of a particular pixel. A smaller value of z indicates that a pixel is closer to the camera 103. The term "b" refers to brightness or, in other words, the IR intensity collected by the IR sensor. With regards to a particular pixel, the higher the intensity (b) value is, the more confidently the system 100 can differentiate the real signal from ambient noise, and the more the system 100 can trust the depth value. Values segmented into a FG or BG region are done with high confidence, whereas pixels initially segmented into the UC region are pixels with regards to which the system 100 is unsure how to categorize. Accordingly, if pixels of a colored image are not categorizable as either FG or BG, the pixels may be categorized as UC. Note that pixels in the same region do not need to be adjacent or near each other to be categorized, as displayed in FIG. 6.

One set of rules to drive this segmentation of the pixels of an image is for the system 100 to: (1) categorize the pixel as foreground (FG) if a depth thereof is less than a predetermined threshold distance from the camera and a intensity thereof is greater than a predetermined threshold intensity; (2) categorize the pixel as unclear (UC) if a depth thereof is less than the predetermined threshold distance and an intensity thereof is less than the predetermined threshold strength; and (3) categorize all other pixels not categorized as FG or UC as background (BG). These rules are cast below in Equation 1, which depicts a region map, rmap[i].

$$\begin{cases} FG \text{ if } (0 < z[i] < z_{thresh} \;\&\; b[i] > b_{thresh}) \\ UC \text{ if } (0 < z[i] < z_{thresh} \;\&\; b[i] < b_{thresh}) \\ \quad BG \text{ else} \end{cases}$$

Figure 7:
FIG. 7 is a screen shot of the region map of FIG. 6 after execution of block 204 of FIG. 2 to detect and clean certain UC and FG 3D-connected components.

FIG. 7 is a screen shot of the region map of FIG. 6 after execution of block 204 of FIG. 2 to detect and clean certain UC and FG 3D-connected components. The purpose of block 204 is to remove noisy parts, such as dots or blobs, or other meaningless fragments that may otherwise remain as FG. This helps to improve BGS quality as well as speeding up the image processing.

The system 100, in executing block 204, begins by detecting and labeling pixels that are adjacent to each other, in the same region, and that have similar depth values as region-specific connected components. In other words, the depth values of two adjacent pixels in the same component is smaller than a predetermined threshold. For instance, the system may detect and label FG-connected components in 3D space (XY plane plus depth, Z). The system 100 thus groups pixels that are determined to be connected components for common processing. In the follow expressions, D is the depth image, p is a pixel, R is the region-labeled map, N(p) are adjacent pixels around pixel p. A 3D connected-component label $C_k \epsilon C$ is defined as $C_k = \{p \epsilon D: \forall pj \epsilon N(p), R(pj) = R(p), ID(pj) - D(p) I < \delta\}$. Let M be a connected component label map. For example $M(p_i)$ may be equal to $C_k$ where C is a set of connected components and where $C_k$ is a connected component (k) in that set.

Note that there may be many components in a region; however, every pixel in the same component includes the same region label. When a UC component is referred to, reference is being made to a connected component in the UC region, for instance.

A meaningful component is a component whose area is larger than some threshold value, $\gamma$. A large UC component, however, is most likely a meaningless component, for example, a part of a wall, a ceiling, or a floor. There are, however, some small-but-meaningful UC component such as human hair, a belt, and a cell phone because these objects tend to absorb infrared (IR) and are objects that should be kept for further processing. The trick is differentiating between meaningful UC components with other noisy small UC components. In general, the meaningful UC components are going to be found adjacent to large, meaningful FG components. From these observations, the system 100 is programmed to delete components based on the following rules:

Rule 1: Categorize as BG any FG connected component having a cross-sectional area less than a predetermined threshold area, $\gamma$.

Rule 2: Categorize as BG any UC connected component having a cross-sectional area greater than $\gamma$, where $\gamma$ may be different than $\gamma$.

Rule 3: Categorize as BG any UC connected component having a cross-sectional area less than $\gamma$ and for which no adjacent component thereof includes a FG connected component having a cross-sectional area greater than $\gamma$.

Note that categorizing FG or UC connected components as BG will have the result of ultimately removing those components when the BG is subtracted.

In preparation for image processing under other blocks, the system may, at or near block 204, find the center of mass (COM) of large FG connected components, such as a target subject, and compute the average depth value for each FG component. In other words, for a FG component $$C_i,\ COM_x(i) = \frac{\sum_{p \in C_i} x(p)}{\text{area}(C_i)}$$

is the x coordinate of pixel p. From the same formula for $COM_y(i)$, compute the average depth as:

$$d_{avg_x(i)} = \frac{\sum_{p \in C_i} D(p)}{\text{area}(C_i)} \quad (2)$$

Figure 8:
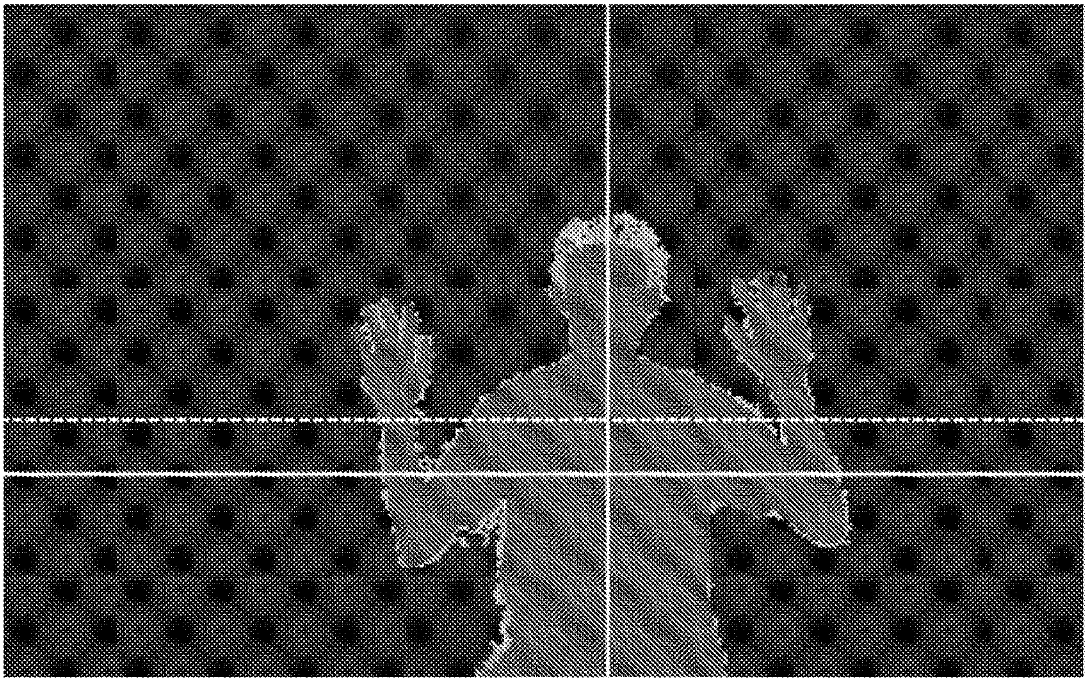
FIG. 8 is a screen shot of the region map of FIG. 7 showing center of mass (COM) lines on both the sitting (or near) subject and the standing (or far) subject.

FIG. 8 is a screen shot of the region map of FIG. 7 showing center of mass (COM) lines on a target subject that happens to be standing up. A sitting subject may be considered to be "near" the camera 103 and a standing subject may be considered to be "far" from the camera 103. Depth images usually suffer from different types of noise depending on the distance between the subject and the camera 103. Furthermore, the size of the body parts (in pixel units) such as hair, fingers, body torso, etc., and their IR intensity values depends on the camera-subject distance. In order to effectively clean up the edges of the subject, therefore, the system 100 uses two user modes in which the data are processed slightly different with different parameters. The modes include a Near Mode (typically for a subject sitting in a chair near the camera 103) and Far Mode (typically for a subject standing up farther away from the camera 103). The system 100 decides between the two modes based on the average depth of the largest FG connected components. It is reasonable to assume that the main subject is the main user 109 of the system 100.

Figure 9:
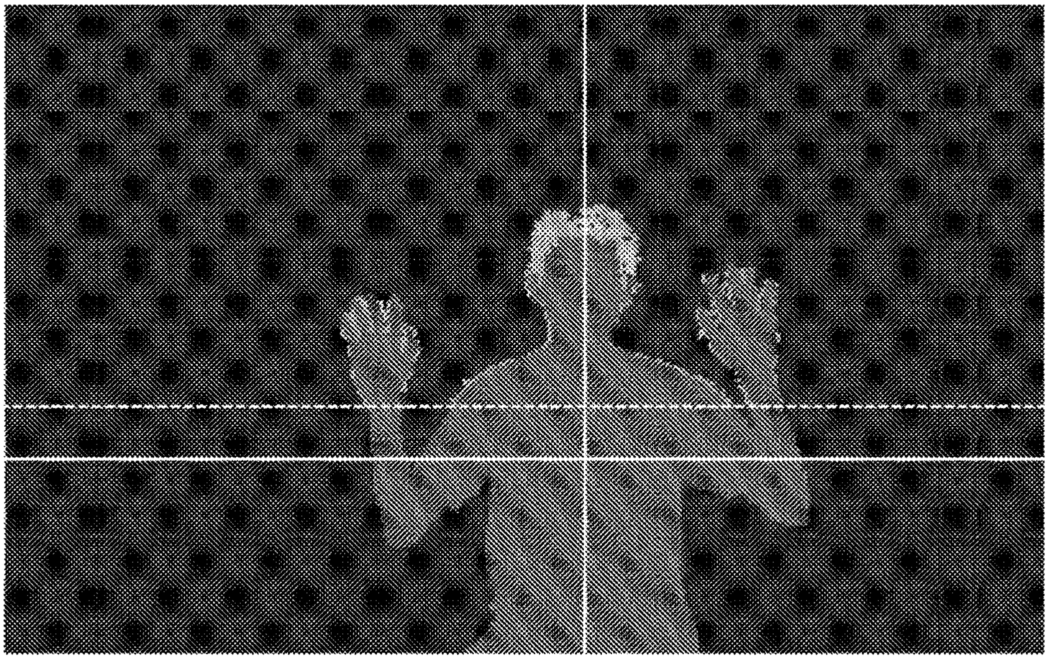
FIG. 9 is a screen shot of the region map of FIG. 8 after execution of block 208 in FIG. 2 to clean the UC region under the COM.

FIG. 9 is a screen shot of the region map of FIG. 8 after execution of block 208 in FIG. 2 to clean the UC region under the COM. Again, here the term "clean" indicates that those parts under the COM will be categorized as BG. The block 208 of FIG. 2 applies only in the Near Mode. This is because, for the Far Mode, the subject is far away from the camera so it is more likely that some parts of the body of the subject will be segmented into the UC region because the IR intensity values of those parts are not high enough. For example, objects and surfaces that have weak IR reflectance include black textures on shirts or jeans, a belt, and other absorbent surfaces or objects. If the system 100 cleans these types of UC pixels too early in the background subtraction process, it would be very difficult to recover them later.

For each of the FG components, the system 100 categorizes all the UC pixels that lie under the COM as BG, thus cleaning those portions from further processing within the UC region. The follow is example pseudo code for block 208:

For each pixel p∈D such that y(p)<$COM_y$//vertically under the COM point

If (R(p)==UC) then R(p)=BG; // clean it=put it in BG region End.

The purpose of block 208 is to help reduce errors caused by unexpected noise around the user and reduce processing time. Simultaneously, the system 100 is still able to keep a hair part, for instance, in the UC region for further processing in subsequent steps that the system 100 may execute, which are shown in FIG. 2.

Figure 10:
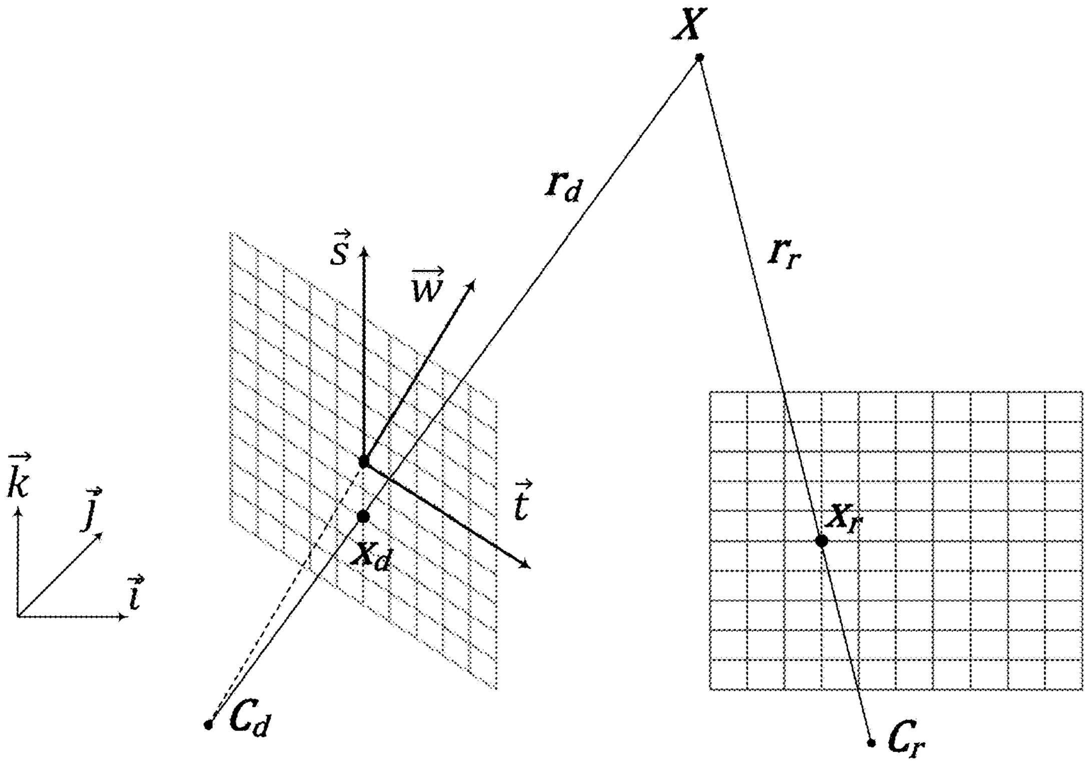
FIG. 10 is a diagram showing that a point X in the 3D space of a captured video image can be warped from the reference image plane (depth sensor viewpoint) to the desired image plane (color sensor viewpoint) as executed in block 210 of FIG. 2.

FIG. 10 is a diagram showing that a point X in the 3D space of a captured video image can be warped from the reference image plane (depth sensor viewpoint) to the desired image plane (color sensor viewpoint) as executed in block 210 of FIG. 2. Warping the UC and FG region in the depth image plane at depth view into the color image plane at a color view shifts the depth information into color pixels at a different location and resolution. Stated in another way, the system 100 may propagate the depth information for the UC and FG regions from the depth sensor into the color sensor, to synchronize the depth information with corresponding pixels in the color image when the color and depth sensors are positioned at a different location in the 3D space.

More particularly, each point of an image in 2D space can be mapped one to one with a ray in 3D space that goes through the camera position. Given a 2D image plane with basis vectors $(\vec{s}, \vec{t})$ and a 3D space $(\vec{i}, \vec{j}, \vec{k})$, the 2D point to 3D ray mapping relation is:

$$r = \begin{bmatrix} r_i \\ r_j \\ r_k \end{bmatrix} = \left[\vec{s}_{ijk}\ \vec{t}_{ijk}\ f \otimes \vec{w}_{ijk}\right] \cdot \begin{bmatrix} u \\ v \\ 1 \end{bmatrix} = P \begin{bmatrix} u \\ v \\ 1 \end{bmatrix} \quad (3)$$

where (u, v) is the 2D coordinate of the point in the image plane; r represents the direction of the corresponding ray; $\vec{s}_{ijk}$, $\vec{t}_{ijk}$, and $\vec{w}_{ijk}$ are representations of $\vec{s}$, $\vec{t}$ and viewing direction $\vec{w}$ in $\{\vec{i}, \vec{j}, \vec{k}\}$. Matrix P is called the mapping matrix.

Consider a point X in 3D space $\{\vec{i}, \vec{j}, \vec{k}\}$. Let $\vec{x}_r$, and $\vec{x}_d$ be homogeneous coordinates of X in the reference image plane and the desired image plane as shown in FIG. 10. Let $P_r$, and $P_d$ be mapping matrices of the reference camera and the desired camera. It has been proven that the warping equation between $\vec{x}_r$, and $\vec{x}_d$ is:

$$\vec{x}_d = P_d^{-1}\left(\frac{|P_r\vec{x}_r|}{d(\vec{x}_r)}(\vec{C}_r - \vec{C}_d) + P_r\vec{x}_r\right) \tag{4}$$

where $d(\vec{x}_r)$ is the depth value of point $\vec{x}_r$.

Figure 11:
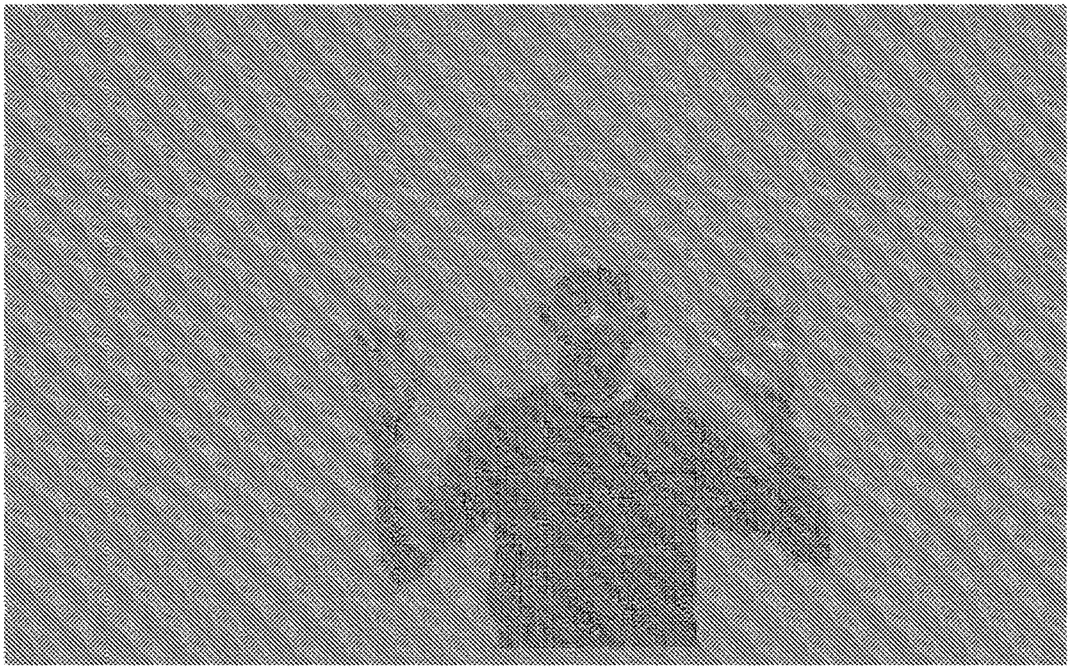
FIG. 11 is a screen shot of a warped FG region of a video image of a subject after execution of the warping in FIG. 10.
Figure 12:
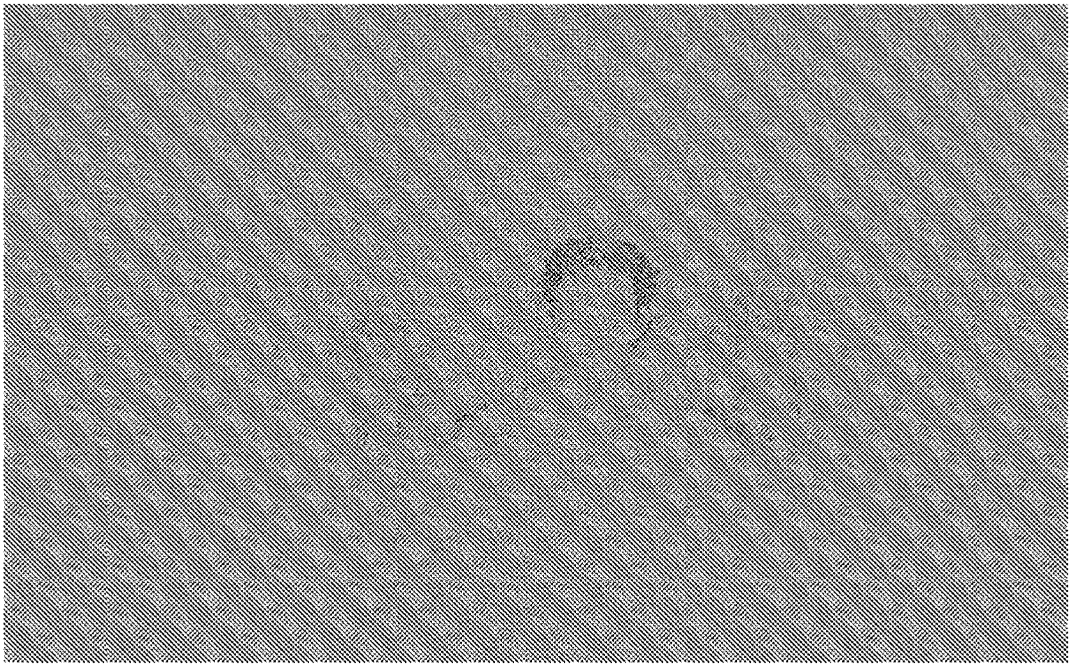
FIG. 12 is a screen shot of a warped UC region corresponding to the video image of FIG. 11.

FIG. 11 is a screen shot of a warped FG region of a video image of a subject after execution of the warping in FIG. 10. FIG. 12 is a screen shot of a warped UC region corresponding to the video image of FIG. 11.

Figure 13:
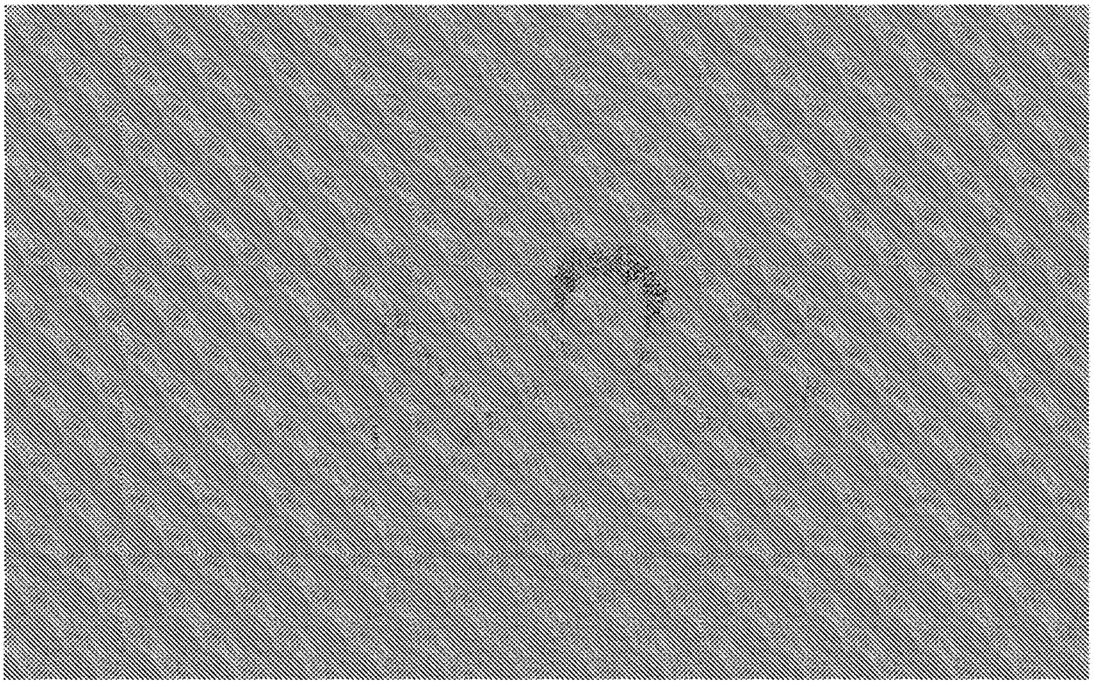
FIG. 13 is a screen shot of the UC region shown in FIG. 12 after execution of block 212 in FIG. 2 to clean the UC region with background history (BGH) of corresponding UC region pixels.

FIG. 13 is a screen shot of the UC region shown in FIG. 12 after execution of block 212 to FIG. 2 to clean the UC region with background history (BGH) of corresponding UC region pixels.

The BGH is a frame that contains only background (BG) pixels. The frame is built in an accumulated fashion from the previous frame. At block 212 of FIG. 2, for each UC pixel, if the BGH is available for the pixel, the system 100 compares the RGB value of the pixel with the corresponding one in the BGH. If the BGH of the pixel is unavailable for some reason, the system 100 searches for the BG H of a neighbor of the pixel and compares the two. If they match, the system 100 sets the pixel to BG. Accordingly, one function for categorizing the UC pixels may be based on color dissimilarity between UC pixels and neighbor pixels of the colored image and based on color dissimilarity between the UC pixels and neighbor pixels of the BGH.

Figure 14:
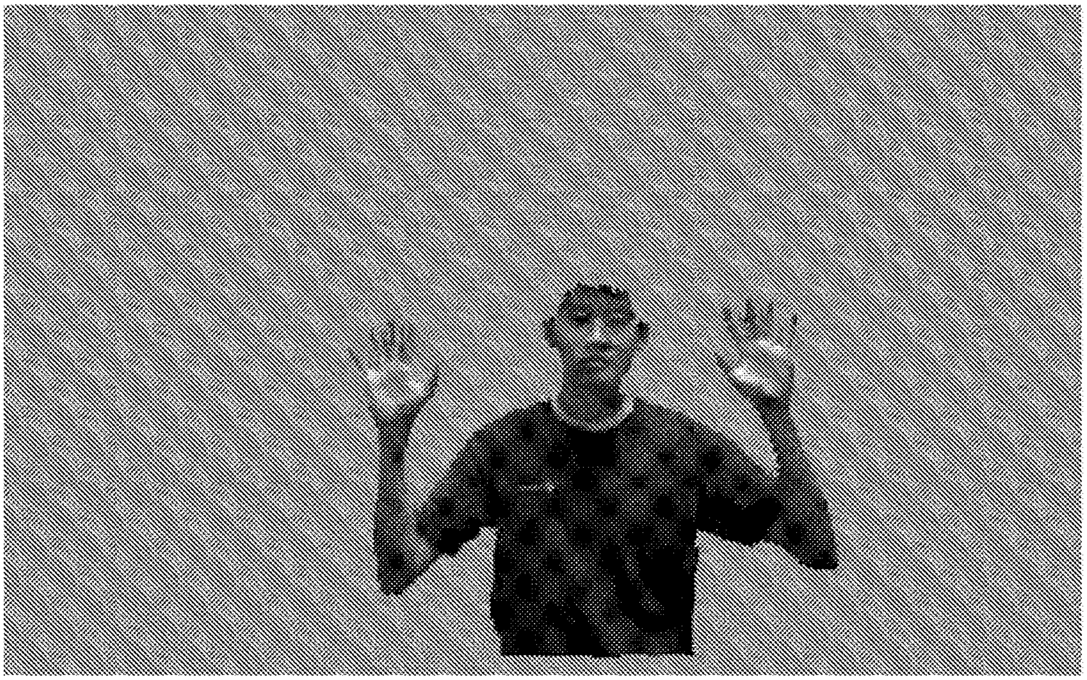
FIG. 14 is a screen shot of the FG region of the video image corresponding to FIGS. 11-13 after execution of block 214 to interpolate the FG region.
Figure 15:
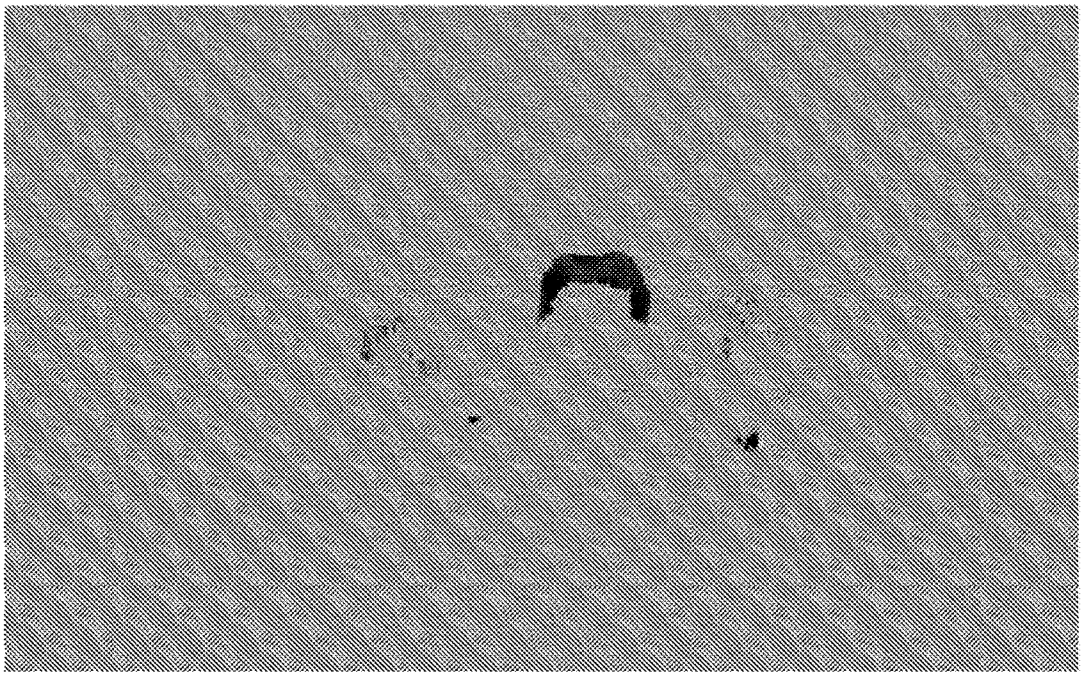
FIG. 15 is a screen shot of the UC region of the video image corresponding to FIGS. 11-13 after execution of block 214 to interpolate the region map.

FIG. 14 is a screen shot of the FG region of the video image corresponding to FIGS. 11-13 after execution of block 214 to interpolate the FG region. FIG. 15 is a screen shot of the UC region of the video image corresponding to FIGS. 11-13 after execution of block 214 to interpolate the region map. After the warping step, the region map of the RGB frame contains lots of unknown values because of the up-sampling from Quarter Video Graphics Array (QVGA) to Video Graphics Array (VGA) resolution. Note that the resolution of the depth image is usually lower than that of the color image. For every pixel, the system 100 checks if the pixel is surrounded by other FG pixels within a predetermined support window, e.g., within a window of a certain number of pixels in width by a certain number of pixels in height. If yes, the system 100 sets the pixel to FG. Otherwise, the system 100 checks to see whether the pixel is surrounded by other UC pixels. If the pixel is surrounded by other UC pixel, the system 100 categorizes the pixel as UC.

Figure 16:
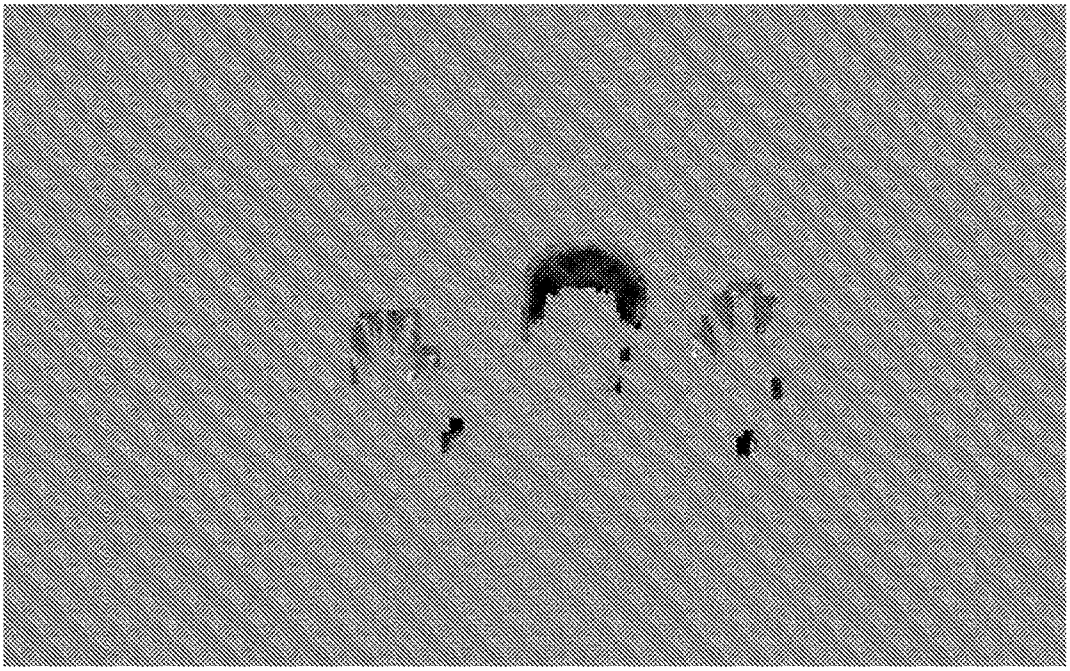
FIG. 16 is a screen shot of the UC region of the video image in FIG. 15 after execution of block 216 of FIG. 2 to dilate the remaining UC region.

FIG. 16 is a screen shot of the UC region of the video image in FIG. 15 after execution of block 216 of FIG. 2 to dilate the remaining UC region. The purpose of the dilation of the current UC region is to ensure that subtle areas in the edges of a target subject such as a hair part or earrings are well covered by the UC region. To execute block 216, the system 100 may dilate the current UC region outward to surrounding pixels that are not in the FG region.

Dilation is one of the two basic operators in the area of mathematical morphology, the other being erosion. It is typically applied to binary images, but there are versions that work on grayscale images. The basic effect of the mathematical morphology operator on a binary image is to gradually enlarge the boundaries of regions of foreground pixels (i.e. white pixels, typically). Thus areas of foreground pixels grow in size while holes within those regions become smaller.

Figure 17:
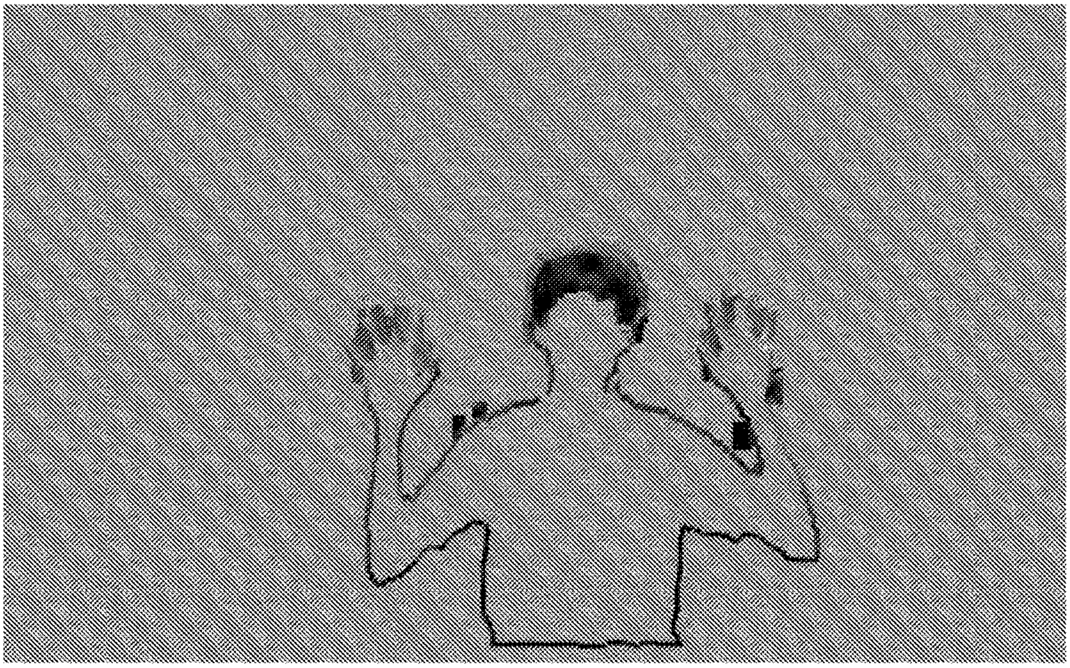
FIG. 17 is a screen shot of the UC region of FIG. 16 after execution of block 218 in FIG. 2 to detect a FG fringe and merge it into the current UC region.

FIG. 17 is a screen shot of the UC region of FIG. 16 after execution of block 218 in FIG. 2 to detect a FG fringe and merge it into the current UC region. At block 218, the system 100 may use the morphological opening operator to detect a FG fringe and merge it into the current UC region.

The purpose of detecting the FG fringe and merging it into the UC region is as follows. Due to the tolerance in registration (or warping between the depth information and color image), depth resolution, interpolation and flickering artifacts, the region map edges shown in FIG. 16 may not be good cutting edges. In fact, there is usually a small mismatch between region map edges and the RGB edges, assuming the RGB edges lie close to the region map edges. With the above opening operator, the system 100 can narrow down the area along the edge to perform further processing to get a FG-BG cut at the RGB edges. This helps significantly reduce processing time.

Figure 18:
FIG. 18 is a screen shot of the BG region of the video image of FIG. 17 after execution of block 220 to update the BGH based on the BG region and any unknown pixels.

FIG. 18 is a screen shot of the BG region of the video image of FIG. 17 after execution of block 220 to update the BGH based on the BG region and any unknown pixels. The system 100 may update the BGH based on all BG and unknown pixels. For each BG and unknown pixel I, if its BGH $I_{BG}$ exists, then the system 100 may set $I_{BG}^{(t)}=0.75I_{BG}^{(t-1)}+0.25I^{(t)}$, else $I_{BG}^{(t)}=I^{(t)}$ if no BGH exists. In the above formula, superscript (I) is the frame index, such that (t−1) indicates the immediate previous history of current frame, t.

Figure 19:
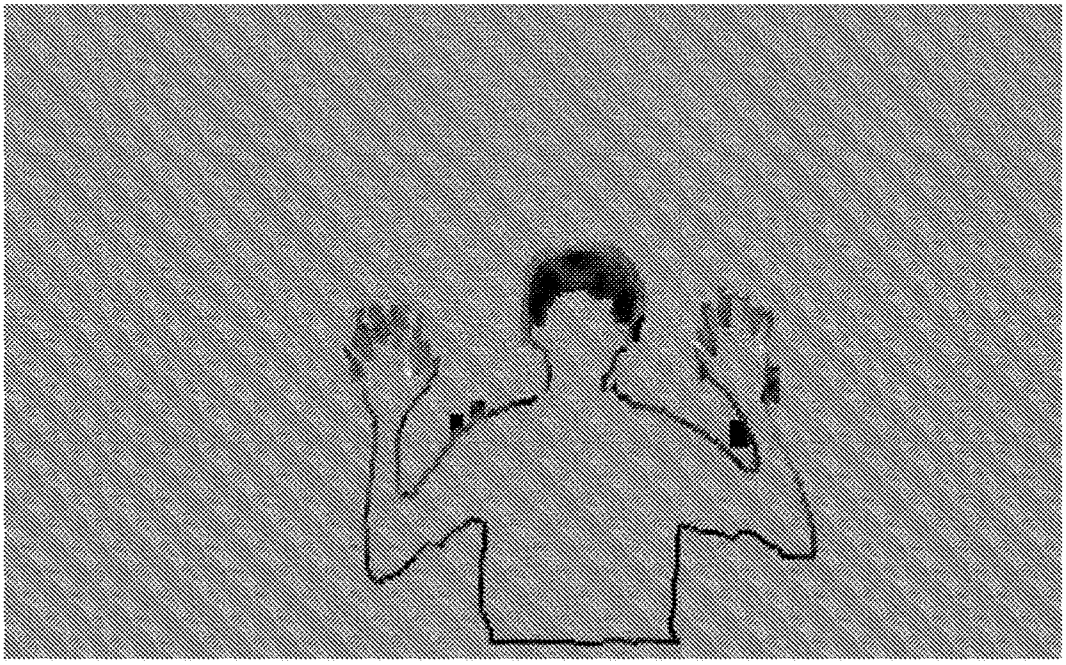
FIG. 19 is a screen shot of the UC region of the video image of FIG. 18 before execution of block 222 of FIG. 2 to clean the UC region using neighbor pixels.
Figure 20:
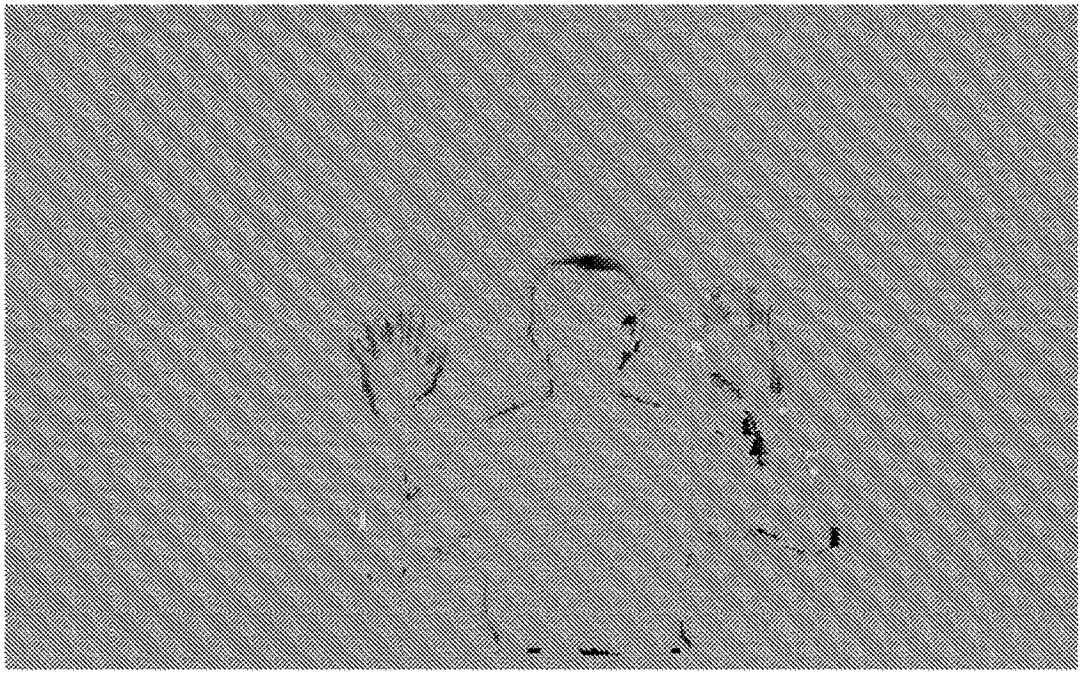
FIG. 20 is a screen shot of the UC region of the video image of FIG. 19 after execution of block 222 of FIG. 2 to clean the UC region using neighbor pixels.

FIG. 19 is a screen shot of the UC region of the video image of FIG. 18 before execution of block 222 of FIG. 2 to clean the UC region using neighbor pixels. FIG. 20 is a screen shot of the UC region of the video image of FIG. 19 after execution of block 222 of FIG. 2 to clean the UC region using neighbor pixels. To execute block 222, the system 100 may compare each UC pixel in the current region map with its neighbors that are not in the UC region. The system 100 may then set the UC region pixels the same as the region of the neighbor that best matches.

Figure 21:
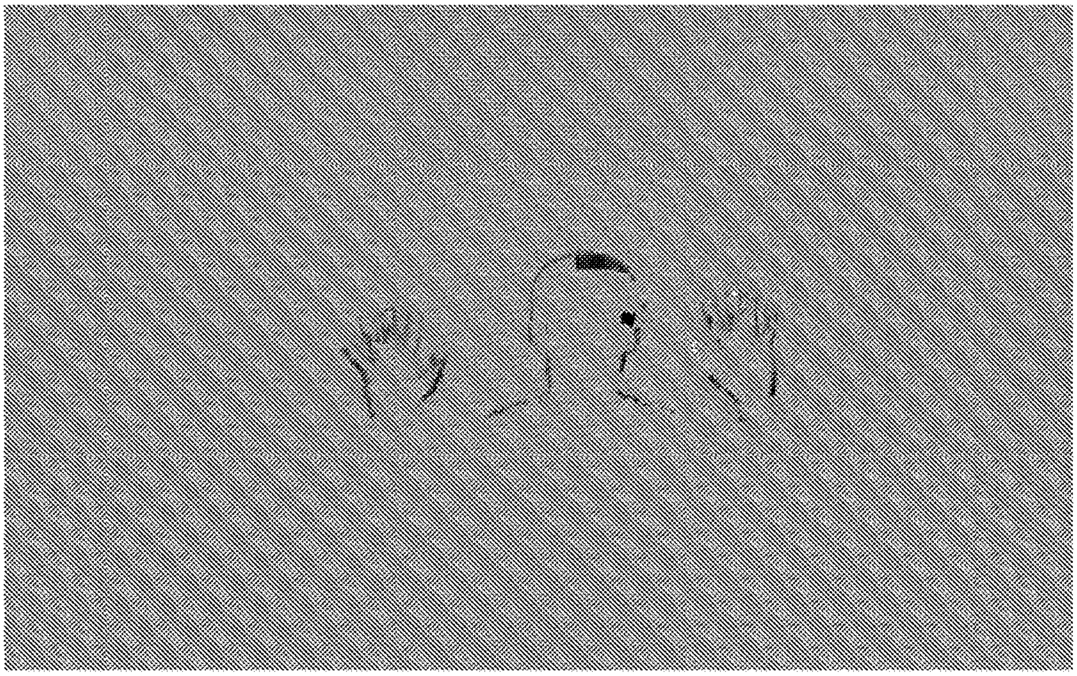
FIG. 21 is a screen shot of the UC region of the video image of FIG. 20 after execution of block 224 to clean the UC region under the COM of the subject.

FIG. 21 is a screen shot of the UC region of the video image of FIG. 20 after execution of block 224 to clean the UC region under the COM of the subject. This step applies for both Near and Far modes. For each FG components, the system 100 may clean, and thus categorize as BG, all UC pixels that lie under the center of mass (COM) point of one or more target subjects, to execute block 224.

Block 224 repeats this cleaning step because the system 100 expanded the UC region around the region map edges at block 216, and after block 222, there may still exist some unresolved UC pixels. Because, after the next step, the UC pixels are set to FG (to recover the top part of the hair), so block 224 helps reduce errors caused by unexpected noisy edges around the user without affecting the hair part (or other reflectance-sensitive area).

Figure 22:
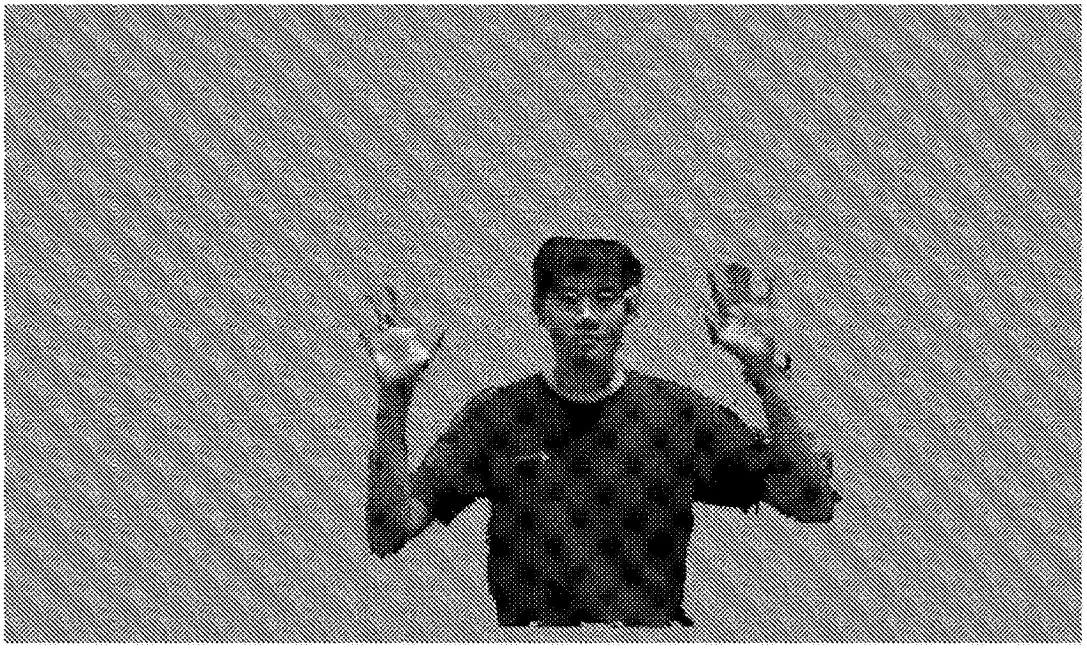
FIG. 22 is a screen shot of the FG region of the video image of FIG. 21 before execution of block 226 of FIG. 2 to apply a median filter to the UC region and merge the remaining UC region with the FG region.
Figure 23:
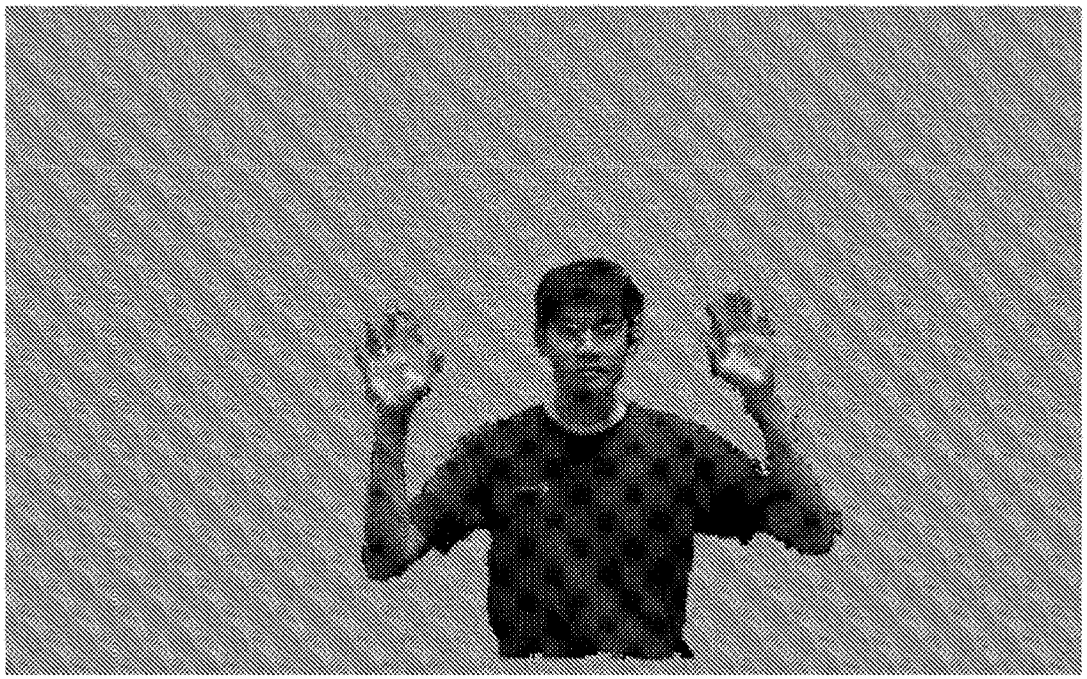
FIG. 23 is a screen shot of the FG region of the video image of FIG. 21 after execution of block 226 of FIG. 2 to apply the median filter to the UC region and merge the remaining UC region with the FG region.

FIG. 22 is a screen shot of the FG region of the video image of FIG. 21 before execution of block 226 of FIG. 2 to apply a median filter to the UC region and merge the remaining UC region with the FG region. FIG. 23 is a screen shot of the FG region of the video image of FIG. 21 after execution of block 226 of FIG. 2 to apply the median filter to the UC region and merge the remaining UC region with the FG region. The screen shot of FIG. 23 also shows the image before execution of block 228.

To execute block 226, the system 100 may remove very small remaining UC connected components, also referred to as fragments, but keep and smoothen the edges of big UC connected components such as part or all of the hair of a target subject. A 7×7 support window may be applied by the median filter to the UC connected components, for instance, or another suitably-sized window may be applied. Then the UC region may be merged with the FG region. Pseudo code to be executed by the system 100 at block 226 may include:

```
For each pixel p in UC region { Count = O;
    For each pixel p_i in the NxN support window around pixel p {
        If R(p_i) = UC, count++;
    }
    If (count<N*N/2), R(p) = BG;
    Else R(p) = FG;
}.
```

Figure 24:
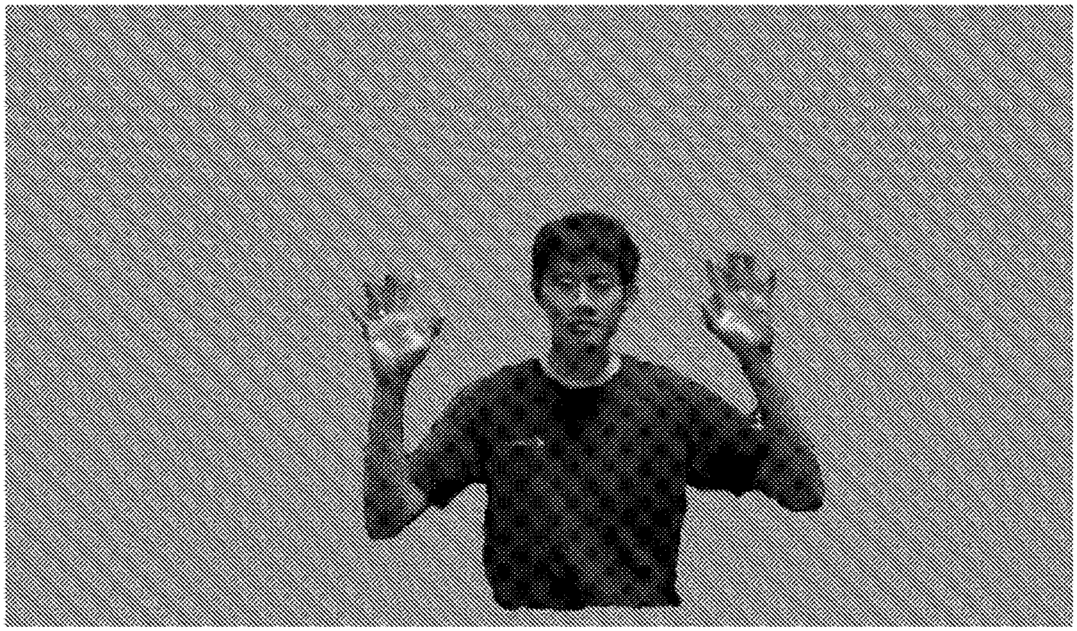
FIG. 24 is a screen shot of the region map of the video image of FIG. 23 after execution of block 228 to stabilize and smooth FG images by reducing flickering and blurring.

FIG. 24 is a screen shot of the region map of the video image of FIG. 23 after execution of block 228 to stabilize and smooth FG images by reducing flickering and blurring. The resultant target FG image(s)/region(s), with the BG subtracted, is/are displayed in the display device 139. To execute block 228, the system 100 may compare the current frames with the region map of the last frame to reduce the flickering around the FG edges. For each UC region pixel before block 224, the system 100 may limit the search area to speed up processing, and if the color of a frame is unchanged from a previous frame, the system 100 may copy the region map value from the previous frame into the current frame. The system 100 may then apply a 5×5 median filter, for instance, and/or spatial filters on the FG pixels to smoothen edges.

Figure 25:
FIG. 25 is a screen shot of an example video image before execution of the background subtraction module of FIG. 2.
Figure 26:
FIG. 26 is a screen shot of the video image of FIG. 25 after execution of the background subtraction module of FIG. 2.
Figure 27:
FIG. 27 is a screen shot of another example video image before execution of the background subtraction module of FIG. 2.
Figure 28:
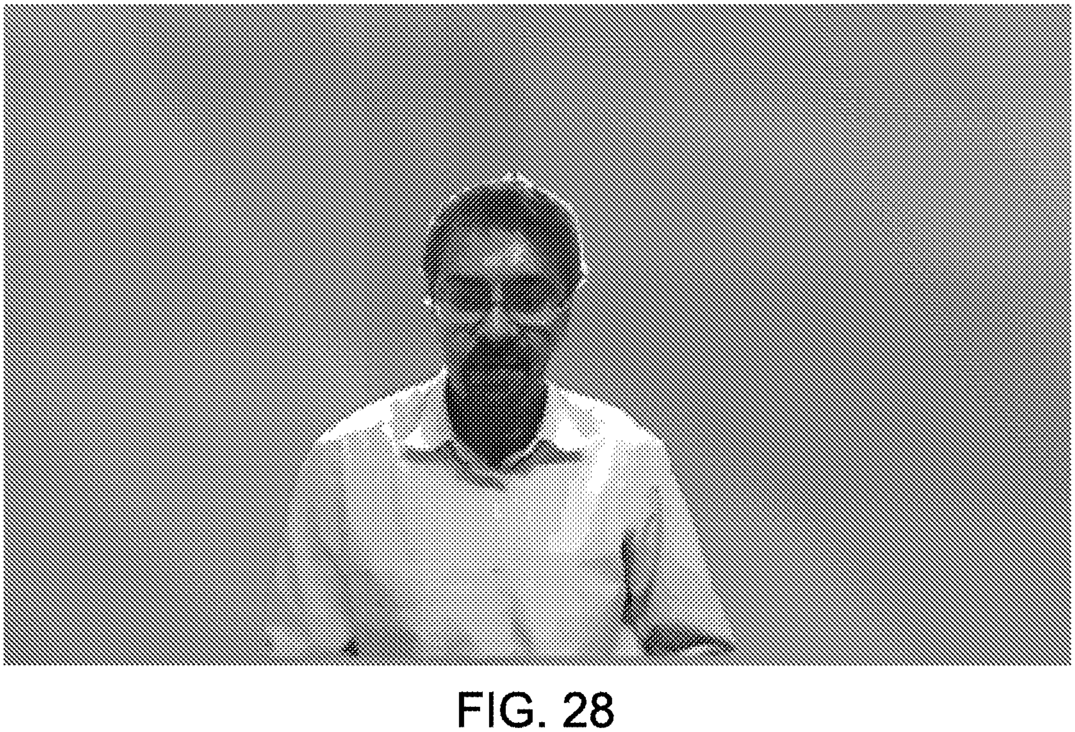
FIG. 28 is a screen shot of the video image of FIG. 27 after execution of the background subtraction module of FIG. 2.

FIG. 25 is a screen shot of an example video image before execution of the background subtraction module of FIG. 2. FIG. 26 is a screen shot of the video image of FIG. 28 after execution of the background subtraction module of FIG. 2. FIG. 27 is a screen shot of another example video image before execution of the background subtraction module of FIG. 2. FIG. 28 is a screen shot of the video image of FIG. 27 after execution of the background subtraction module of FIG. 2.

At block 230 of FIG. 2, the system 100 may detect reset conditions, which is a block available to the system 100 throughout the background subtraction process. If a reset condition is detected, a reset flat is set to true. A reset condition may include, but not be limited to the following examples. (1) The system 100 may receive an indication that the camera is shaken, which makes the background history (BGH) useless. (2) The target subject may be too close to the camera 103, which causes a large IR saturation area, resulting in a large unknown or background area, wherein the system 100 may mistakenly update the BGH. (3) The user may move from the BG to the FG. When the target subject was in the background (BG), the BGH of corresponding pixels was updated. When the target subject moves into the FG of the scene, the BGH behind the target subject is no longer correct and needs to be reset. (4) The system 100 may detect a significant lighting change, which also makes the BGH useless. At block 234 of FIG. 2, the system 100 may detect whether the reset flag has been set. If it has, the system 100 resets the background (BG) mask and the BGH at block 240.

Figure 29:
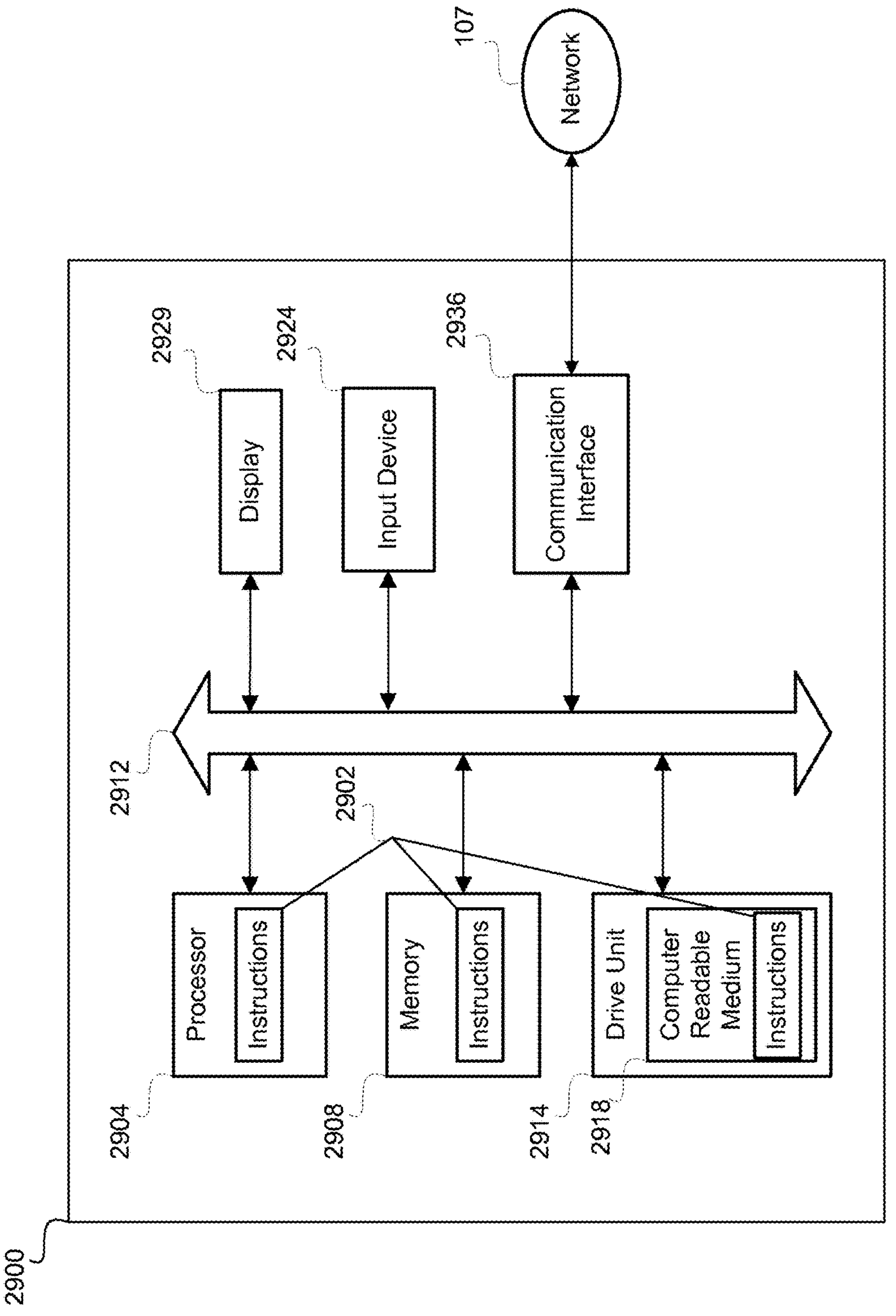
FIG. 29 illustrates a general computer system, which may represent any of the computing devices referenced herein.

FIG. 29 illustrates a general computer system 2900, which may represent the computing device 101 or any computer or computing devices referenced herein. The computer system 2900 may include an ordered listing of a set of instructions 2902 that may be executed to cause the computer system 2900 to perform any one or more of the methods or computer-based functions disclosed herein. The computer system 2900 may operate as a stand-alone device or may be connected, e.g., using the network 116, to other computer systems or peripheral devices.

In a networked deployment, the computer system 2900 may operate in the capacity of a server or as a client-user computer in a server-client user network environment, or as a peer computer system in a peer-to-peer (or distributed) network environment. The computer system 2900 may also be implemented as or incorporated into various devices, such as a personal computer or a mobile computing device capable of executing a set of instructions 2902 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 2900 may include a processor 2904, such as a central processing unit (CPU) and/or a graphics processing unit (GPU). The Processor 2904 may include one or more general processors, digital signal processors, application specific integrated circuits, field programmable gate arrays, digital circuits, optical circuits, analog circuits, combinations thereof, or other now known or later-developed devices for analyzing and processing data. The processor 2904 may implement the set of instructions 2902 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 2900 may include a memory 2908 on a bus 2912 for communicating information. Code operable to cause the computer system to perform any of the acts or operations described herein may be stored in the memory 2908. The memory 2908 may be a random-access memory, read-only memory, programmable memory, hard disk drive or any other type of volatile or non-volatile memory or storage device.

The computer system 2900 may also include a disk or optical drive unit 2914. The disk drive unit 2914 may include a computer-readable medium 2918 in which one or more sets of instructions 2902, e.g., software, can be embedded. Further, the instructions 2902 may perform one or more of the operations as described herein. The instructions 2902 may reside completely, or at least partially, within the memory 3208 and/or within the processor 2904 during execution by the computer system 2900. Accordingly, the BGH database described above in FIG. 1 may be stored in the memory 2908 and/or the disk unit 2914.

The memory 2908 and the processor 2904 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 2900 may include an input device 2924, such as a keyboard or mouse, configured for a user to interact with any of the components of system

2900. It may further include a display 2929, such as a liquid crystal display (LCD), a cathode ray tube (CRT), or any other display suitable for conveying information. The display 2929 may act as an interface for the user to see the functioning of the processor 2904, or specifically as an interface with the software stored in the memory 2908 or the drive unit 2914.

The computer system 2900 may include a communication interface 2936 that enables communications via the communications network 116. The network 116 may include wired networks, wireless networks, or combinations thereof. The communication interface 2936 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of: hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implantation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A mobile computing device comprising:

at least one color sensor configured to obtain color frames of a scene having a target subject, the color frames having a color sensor viewpoint;

a depth sensor having an infrared illuminator and an infrared sensor, configured to generate depth data of the scene from a depth sensor viewpoint;

a processor and memory configured to:

a) identify a set of potential foreground pixel locations by processing the depth data;

b) detect one or more foreground connected components;

c) determine a near mode based on an average depth of the one or more foreground connected components;

d) responsive to determining the near mode, form a reduced set of potential foreground pixel locations by removing some pixel locations from the set of potential foreground pixel locations that are below a center of the one or more connected foreground components;

e) process the reduced set of potential foreground pixel locations to generate aligned foreground depth data associated with a target user by warping the reduced set of potential foreground pixel locations from the depth sensor viewpoint to the color sensor viewpoint; and, f) construct at least one new color image based on the aligned foreground depth data and the color frames from the at least one color sensor.

2. The mobile computing device of claim 1, wherein the processor and memory are further configured to display the at least one new color image as frames in a video stream.

3. The mobile computing device of claim 2, wherein the video stream is displayed in real-time.

4. The mobile computing device of claim 1, wherein identifying a set of potential foreground pixel locations by processing the depth data comprises, for each of a plurality of pixels, each pixel having a depth along a Z axis from the depth sensor, identifying a pixel as a potential foreground pixel if its respective depth is less than a predetermined threshold distance.

5. The mobile computing device of claim 1, wherein the near mode is determined according to an average depth of a largest connected foreground component.

6. The mobile computing device of claim 1, wherein the set of potential foreground pixels is further reduced according to color information and background history (BGH) information associated with the potential foreground pixels.

7. The mobile computing device of claim 1, further comprising, assigning depth values to each foreground pixel of the color frame having unknown depth values by interpolating the aligned foreground depth data.

8. The mobile computing device of claim 1, wherein detecting one or more foreground connected components comprises labeling as foreground connected components pixels that are (i) adjacent to each other, (ii) identified as potential foreground pixels, and (iii) have adjacent depth values within a predetermined threshold.

9. The system of claim 8, wherein foreground connected components are further limited to pixels having a depth value less than a predetermined threshold distance and an intensity value greater than a predetermined threshold intensity.

10. The system of claim 1, wherein the at least one new color image further comprises at least one image from a second video.

* * * * *